Sept. 27, 1955                A. C. MUELLER ET AL                2,718,683
                        AUTOMATIC DINNERWARE MAKING MACHINE
Filed May 23, 1952                                              12 Sheets-Sheet 1
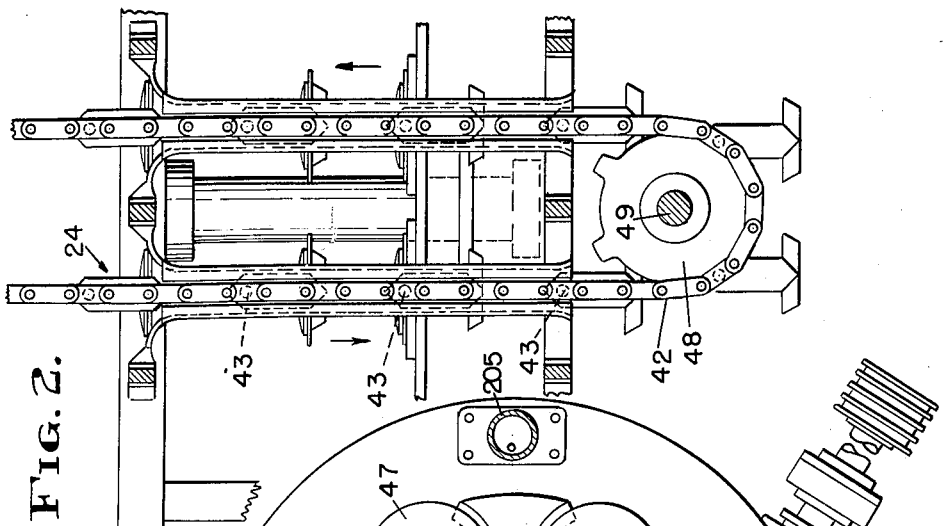
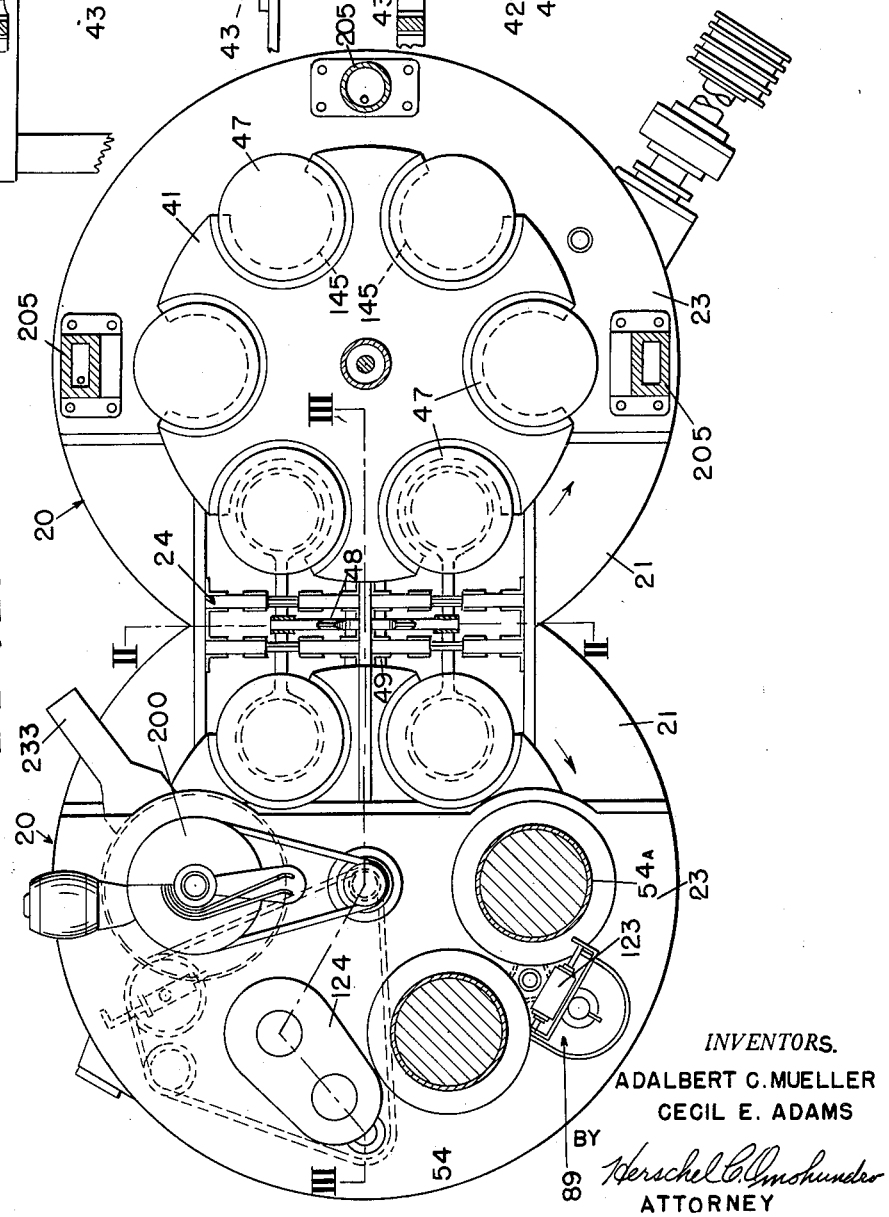
INVENTORS.
ADALBERT C. MUELLER
CECIL E. ADAMS
BY
Herschel C. Omohundro
ATTORNEY INVENTORS
ADALBERT C. MUELLER
CECIL E. ADAMS
BY
Herschel C. Omohundro
ATTORNEY Sept. 27, 1955     A. C. MUELLER ET AL     2,718,683
AUTOMATIC DINNERWARE MAKING MACHINE
Filed May 23, 1952     12 Sheets-Sheet 4
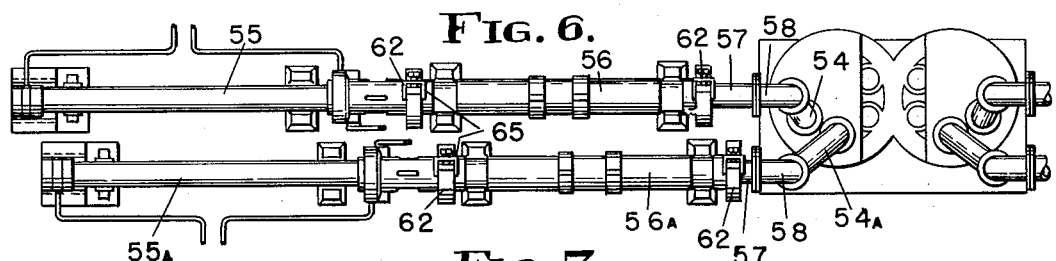
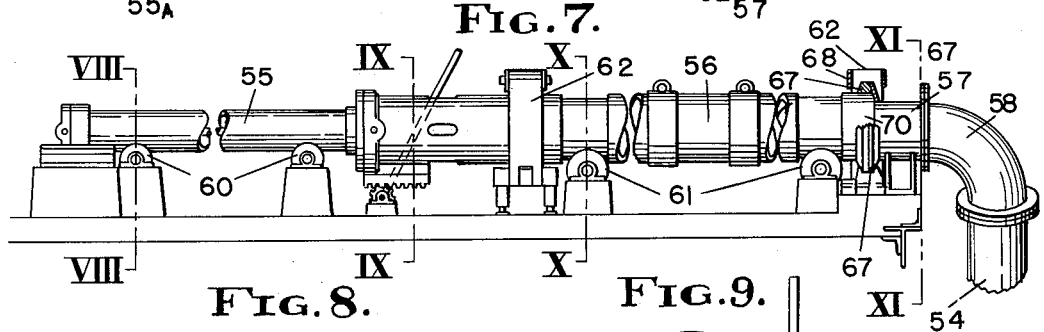
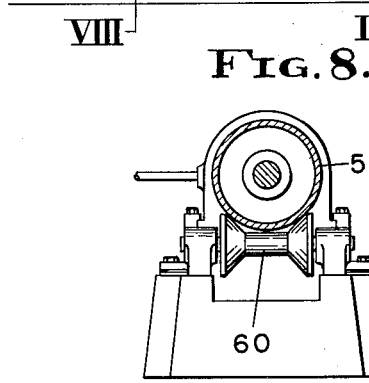
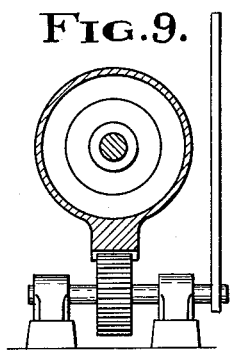
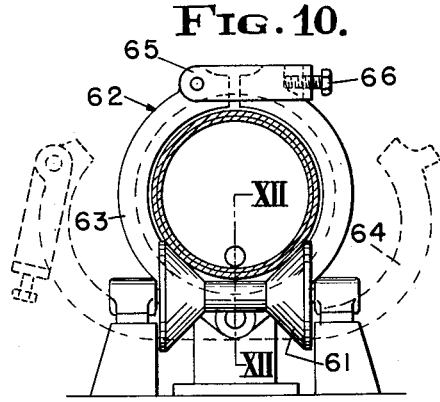
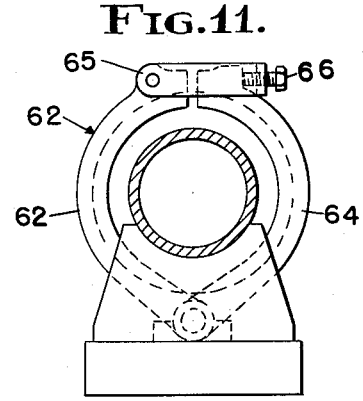
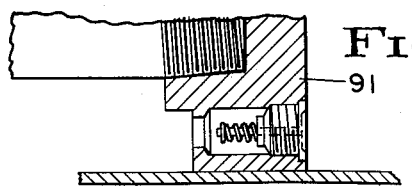
*INVENTORS*
ADALBERT C. MUELLER
BY   CECIL E. ADAMS
*Herschel C. Omohundro*
ATTORNEY

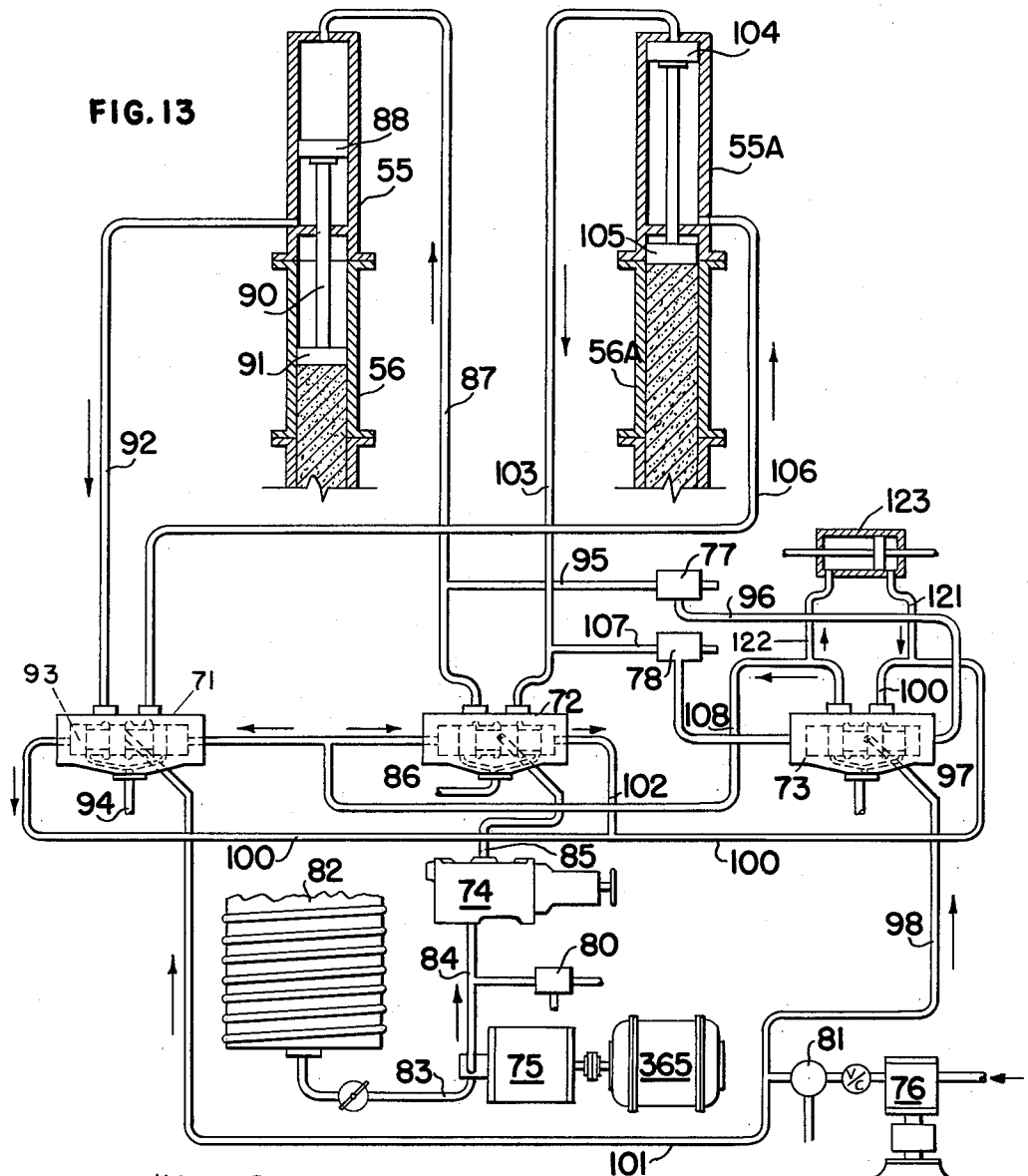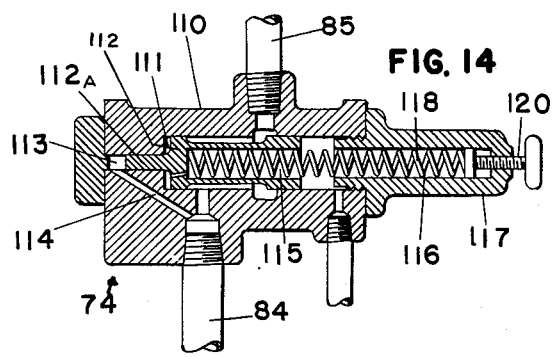

Sept. 27, 1955　　A. C. MUELLER ET AL　　2,718,683
AUTOMATIC DINNERWARE MAKING MACHINE
Filed May 23, 1952　　12 Sheets-Sheet 6

INVENTORS
ADALBERT C. MUELLER
CECIL E. ADAMS
BY Herschel C. Omohundro
ATTORNEY

Sept. 27, 1955  A. C. MUELLER ET AL  2,718,683

AUTOMATIC DINNERWARE MAKING MACHINE

Filed May 23, 1952  12 Sheets-Sheet 11

INVENTOR.
ADALBERT C. MUELLER
BY  CECIL E. ADAMS

Herschel C. Smohundro
ATTORNEY

INVENTORS
ADALBERT C. MUELLER
BY  CECIL E. ADAMS
ATTORNEY

# United States Patent Office 2,718,683
Patented Sept. 27, 1955

2,718,683

AUTOMATIC DINNERWARE MAKING MACHINE

Adalbert C. Mueller and Cecil E. Adams, Columbus, Ohio, assignors to The Denison Engineering Company, Columbus, Ohio Original application December 8, 1945, Serial No. 633,782, now Patent No. 2,557,884, dated June 19, 1951. Divided and this application May 23, 1952, Serial No. 289,545

5 Claims. (Cl. 25—23)

This invention relates generally to the ceramic art and is more particularly directed to mechanism for automatically forming clay or similar plastic materials into dinnerware and like articles.

This application is a divisional application of our copending application Serial No. 633,782, filed December 8, 1945, for "Automatic Dinnerware Making Machine," now Patent No. 2,557,884, dated June 19, 1951.

An object of this invention resides in providing an automatic dinnerware manufacturing machine which may be continuously operated to supply clay to means for severing the same into bats which are positioned on molds, to press the bats into the approximate shape of the article desired and then to jigger the previously pressed pieces into the final shape after which the molds with the formed pieces thereon are removed from the machine for drying.

Another object of the invention is to provide a machine for making dinnerware having a table-like carrier above which clay feed and cut-off means, forming dies and jiggering devices are supported in spaced relation, the machine also having means for rotating the carrier step by step to successively position molds carried thereby in registration with such devices and means actuated by fluid pressure at points of stoppage of said molds for moving the latter from the carrier to position wherein clay bats disposed on the molds may be operated upon by the dies and jiggering devices.

It is also an object of the invention to provide a pair of the machines mentioned in the preceding paragraph, dispose the machines in adjoining relationship and synchronously operate them, a conveyor being disposed between the machines to simultaneously deliver empty molds thereto and remove loaded ones therefrom, each of the machines being further provided with dual clay feeding means so that both may be continuously operated to secure high production rates, the machines and the clay feeds being actuated in part by fluid pressure whereby smooth, uniform, relatively quiet operation will be secured.

Another object of the invention is to provide a dinnerware making machine of the type mentioned in the preceding paragraphs having improved fluid pressure operated means for moving molds with clay bats thereon into and out of their various forming positions, the machine having mechanism for controlling the admission of fluid pressure to the mold moving means whereby the maximum output of the machines will be secured without any decrease in quality of the ware.

A further object is to provide the hydraulically operated mold moving means with control mechanism which will so govern the flow of pressure fluid to such means that the molds will be moved with a uniformly accelerated and decelerated motion toward the forming means, jerkiness and possible damage to the bats being formed thus being avoided.

A still further object of the invention is to provide a dinnerware making machine having mold moving means including a power cylinder and piston and a control mechanism with valve elements which are movable both relatively and in unison and providing means for moving the elements, one of such means being directly responsive to the movement of the piston of the power cylinder. The mechanism is thus rendered sensitive and positive in operation, simple and easy to maintain and service.

Another object of the invention is to provide the hydraulic system of the machine with control mechanism which will stop the operation thereof in the event the proper operating pressures are not maintained, the machine therefore being prevented from producing incorrectly shaped articles or from injury in the event the various parts of the machine are not operated in the essential sequence.

It is also an object to provide a control mechanism which will discontinue the operation of the machine in the event certain conditions are not maintained and when such conditions are restored will cause the various operating parts of the machine to function in the necessary sequence when the operation is resumed.

Further objects and advantages of the present invention will be apparent from the following description, reference being had to the accompanying drawings wherein a preferred form of embodiment of the invention is clearly shown.

In the drawings:

Fig. 1 is a top plan view, partly in horizontal section, of a dinnerware forming machine formed in accordance with the present invention.

Fig. 2 is a vertical transverse sectional view taken on the plane indicated by the line II—II of Fig. 1.

Fig. 6 is a plan view of the machine on a reduced scale showing also in plan the means for feeding clay to one side of the machine.

Fig. 7 is a side elevational view of the clay feeding machine shown in Fig. 6.

Fig. 8 is a vertical transverse sectional view taken through the clay feeding mechanism on the plane indicated by the line VIII—VIII of Fig. 7.

Fig. 9 is a similar view taken through the clay feeding mechanism on the plane indicated by the line IX—IX of Fig. 7.

Fig. 10 is also a similar view taken through the clay feeding mechanism on the plane indicated by the line X—X of Fig. 7, this figure showing clamping means employed to secure a clay magazine to the power unit used to expel clay from the magazine to the dinnerware forming machine.

Fig. 11 is a similar view taken through the forward portion of the clay feeding mechanism on the plane indicated by the line XI—XI of Fig. 7.

Fig. 12 is a detail vertical sectional view taken on the plane indicated by the line XII—XII of Fig. 10.

Fig. 13 is a diagrammatic view of the hydraulic circuit employed to operate the clay feeding mechanism shown in Figs. 6 and 7.

Fig. 14 is a vertical longitudinal sectional view taken through a pressure building valve by which the volumetric delivery of the pump in the hydraulic system shown in Fig. 13 is maintained constant.

Figure 3:
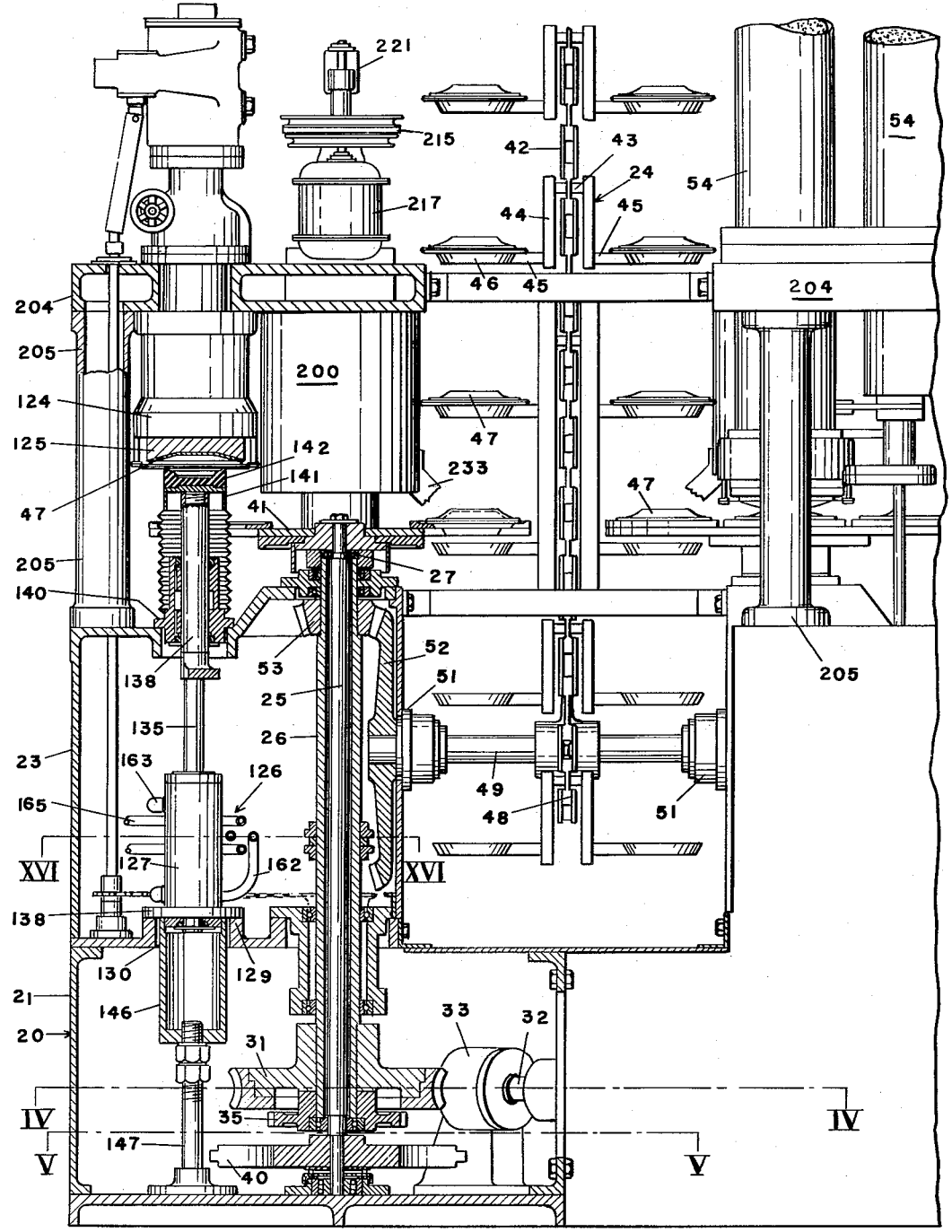
Fig. 3 is a similar view taken through the machine on the plane indicated by the line III—III of Fig. 1.
Figure 4:
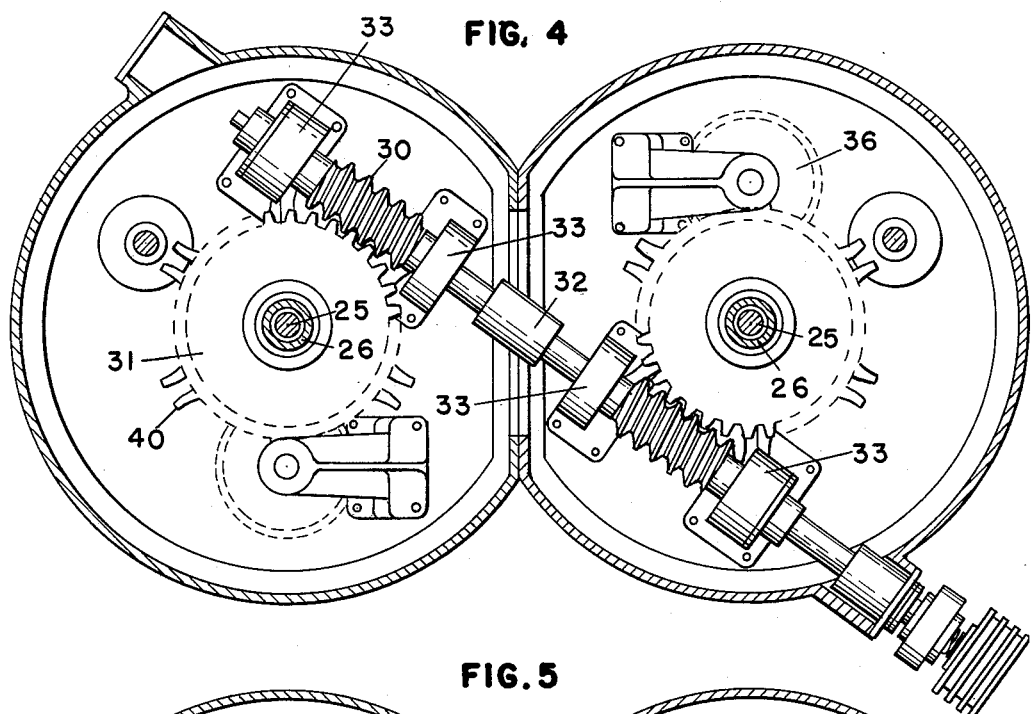
Fig. 4 is a detail horizontal sectional view taken through the base of the machine shown in Fig. 3 on the plane indicated by the line IV—IV of Fig. 3.
Figure 5:
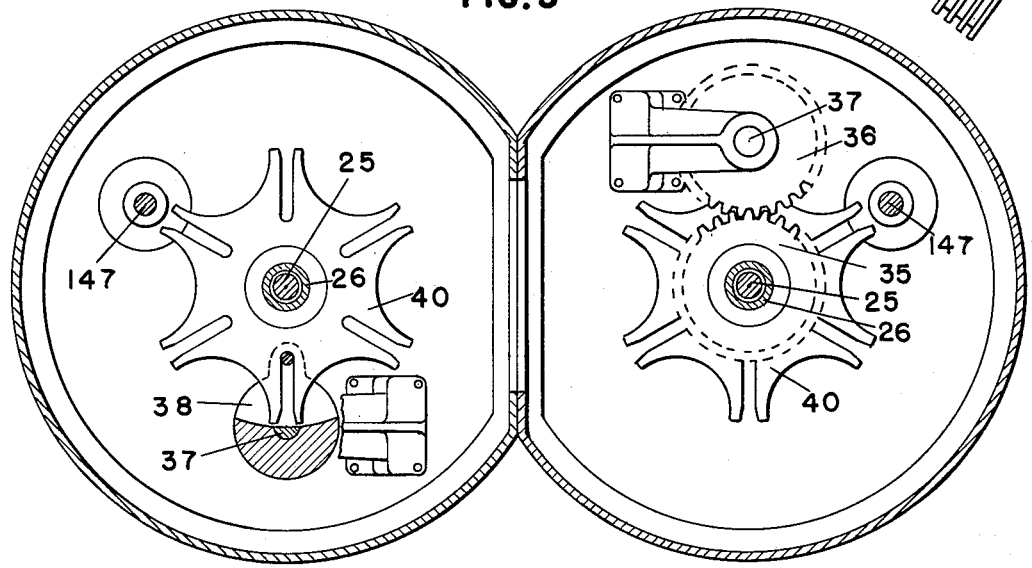
Fig. 5 is a similar view taken on the plane indicated by the line V—V of Fig. 3.
Figure 16:
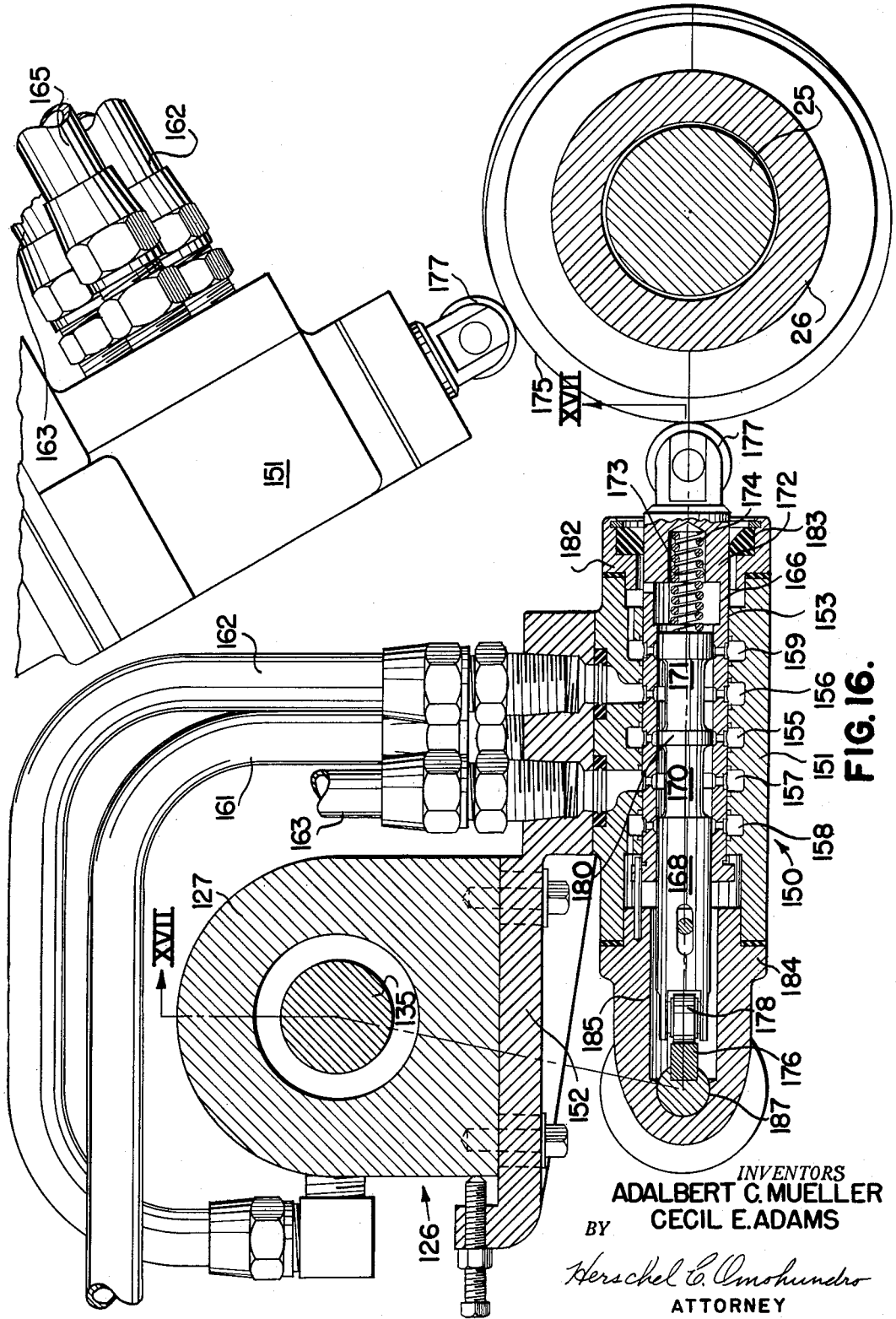

Fig. 16 is a detail horizontal sectional view, partly in elevation, taken through a portion of the machine shown in Fig. 3 on the plane indicated by the line XVI—XVI of Fig. 3, this figure showing mechanism for controlling the flow of fluid to the power unit employed to move a mold with a clay bat thereon into engagement with a forming die and showing in elevation, also, the control mechanism for the power unit employed to move a previously formed bat into engagement with a jiggering tool, the control mechanisms being shown in the relative positions occupied in the machine.

Figure 17:
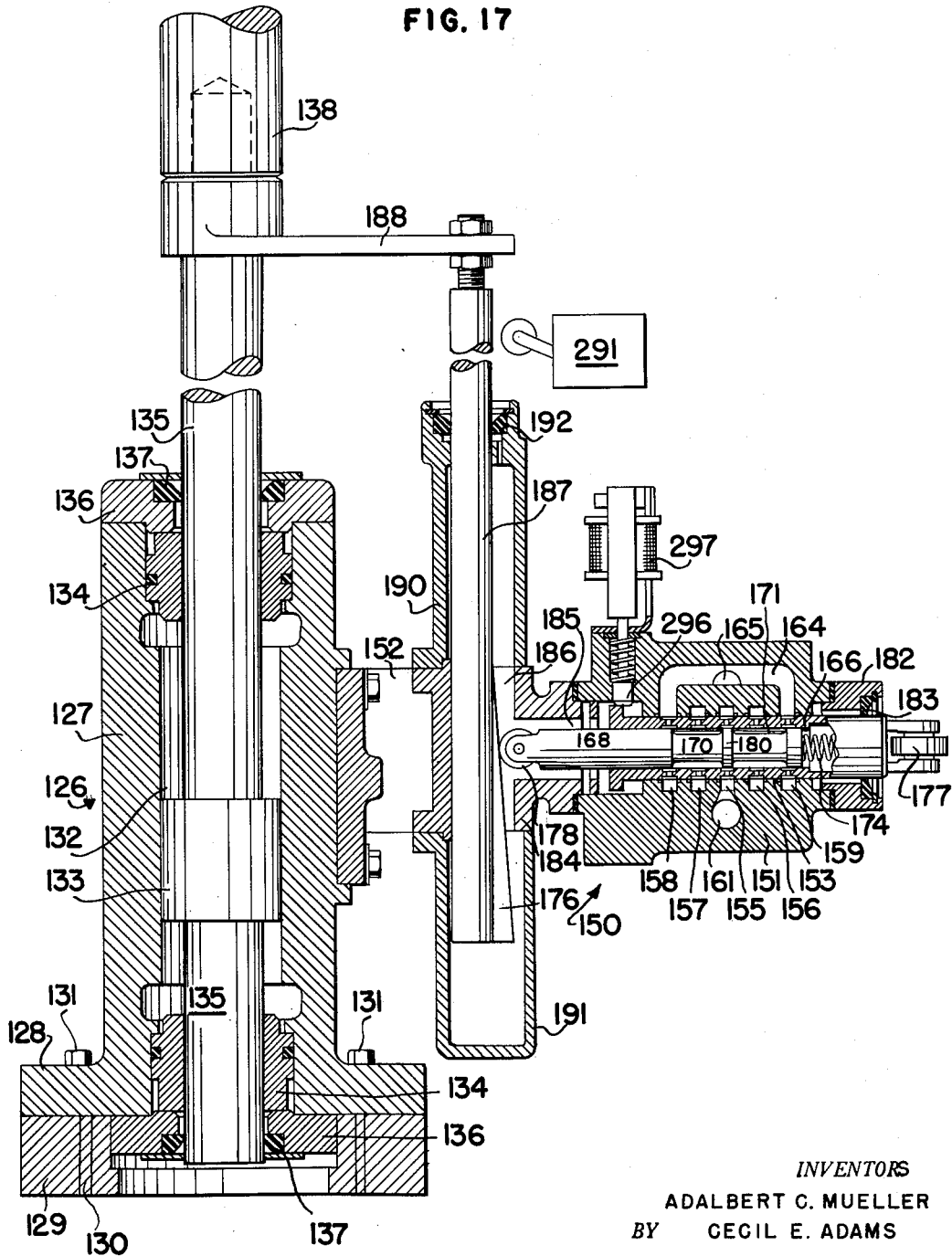

Fig. 17 is a vertical longitudinal sectional view taken through the control mechanism and the power unit governed thereby, the plane of this section being indicated by dotted line XVII—XVII of Fig. 16. While the line is bent at several points, the view is made to appear as though the line were straight for the purpose of clarity.

Figure 18:
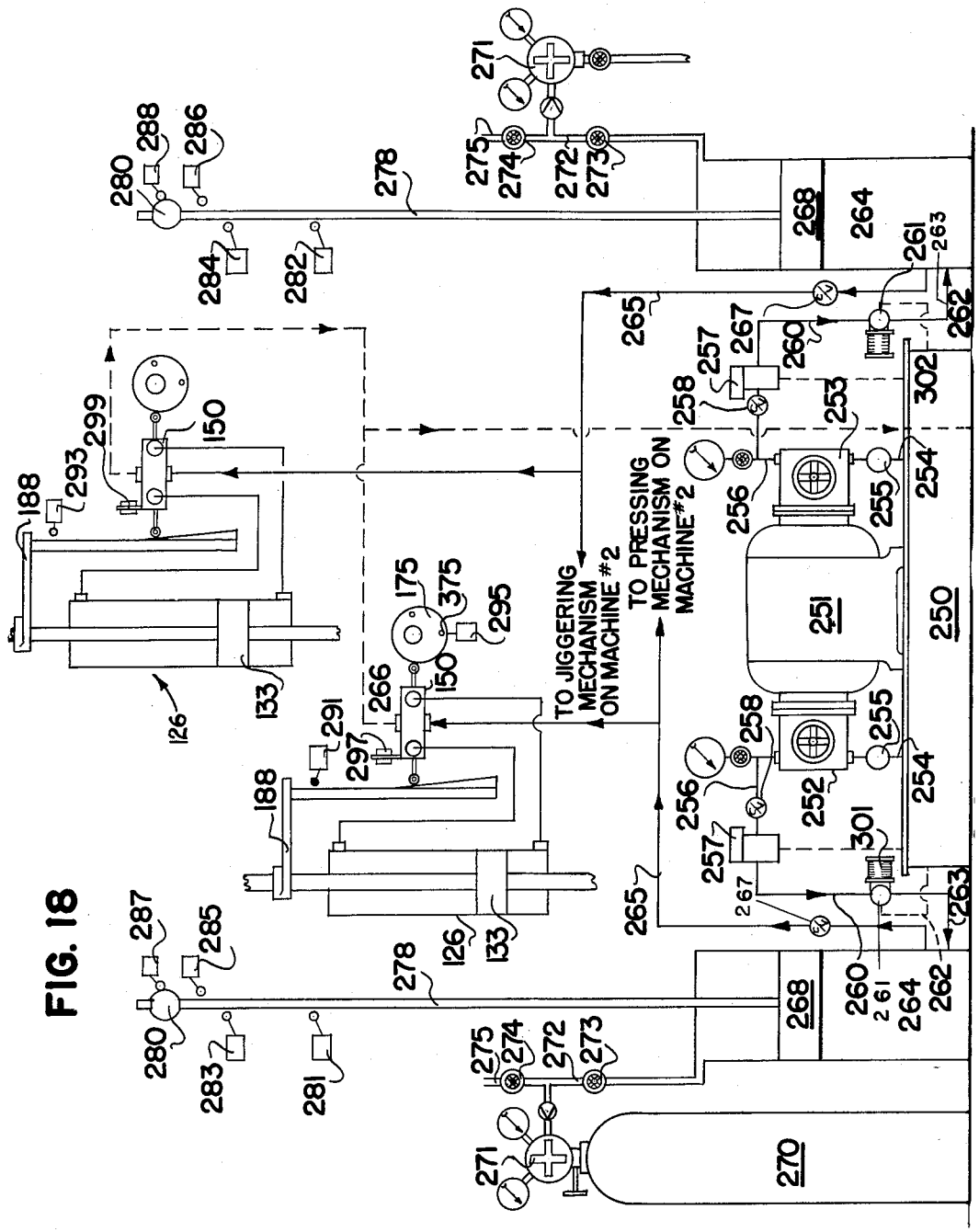

Fig. 18 is a diagrammatic view of the dual pressure hydraulic system employed in the operation of the pressing and jiggering mechanism.

Figure 19:
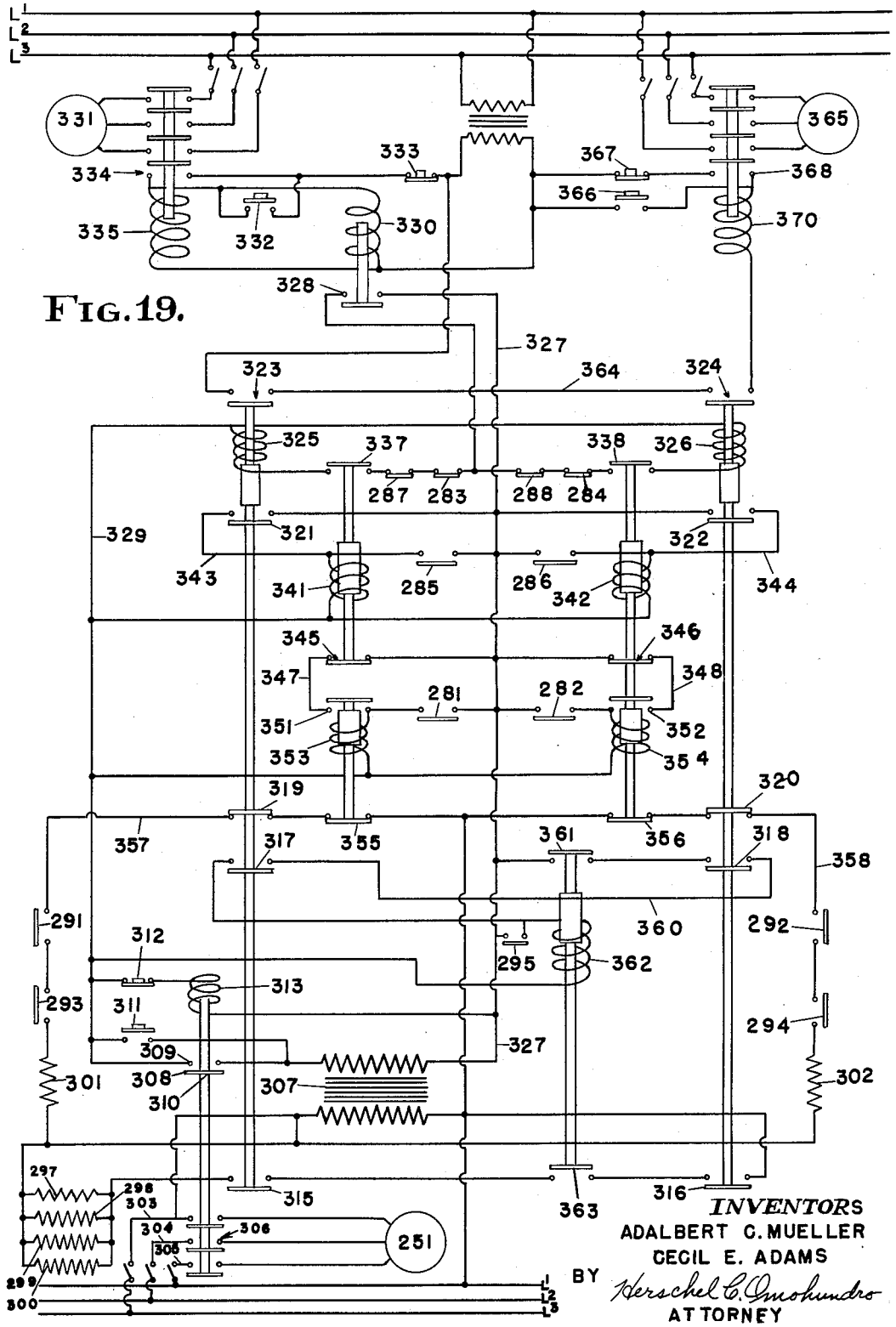

Fig. 19 is a diagrammatic view of the electrical circuit employed in the operation of the complete wareforming machine.

Figure 20:
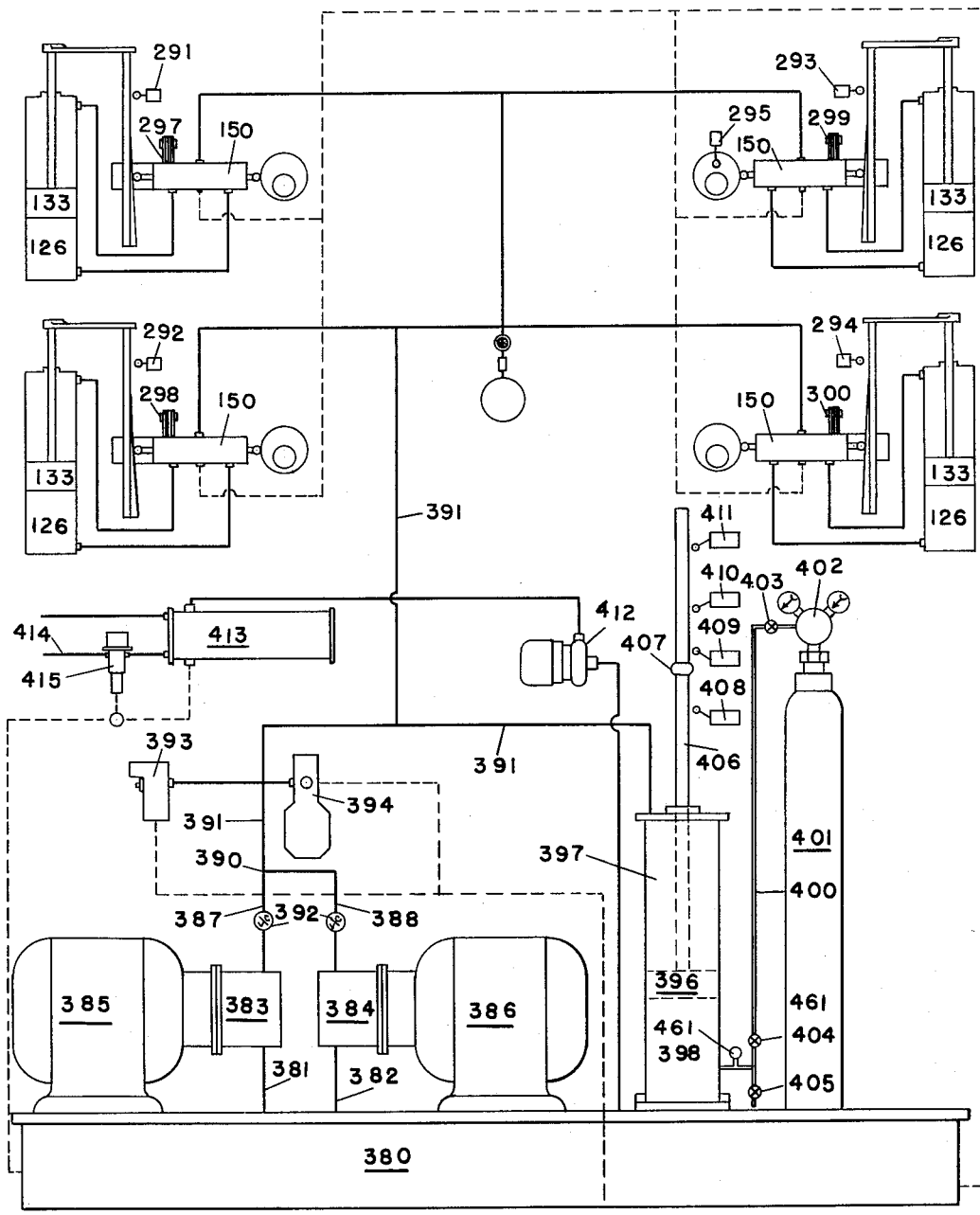

Fig. 20 is also a diagrammatic view of a single pressure hydraulic system which might be employed in the operation of the pressing and jiggering mechanism, a standby motor and pump being provided to avoid idle periods in the event service is necessary on one or the other of the pumps.

Figure 21:
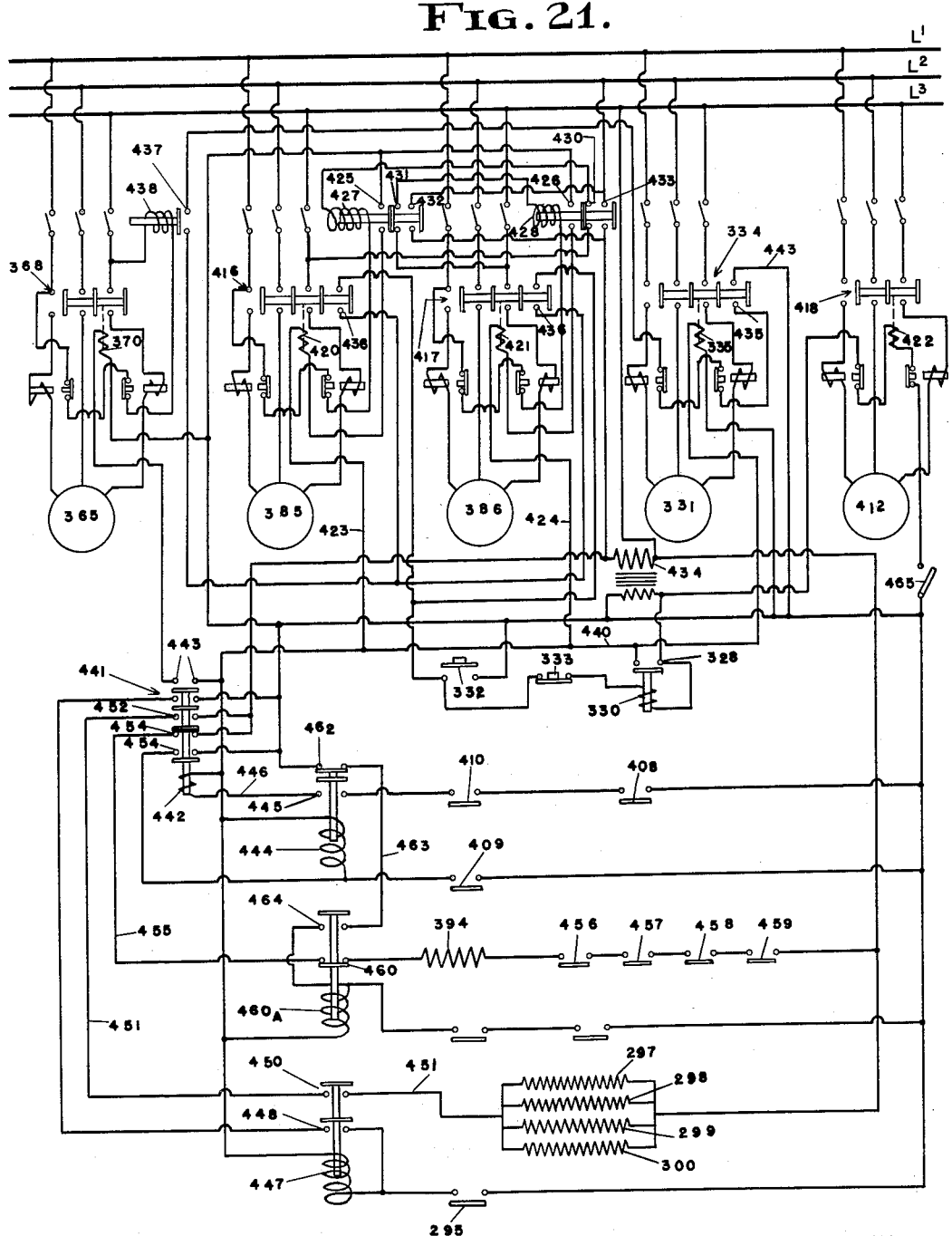

Fig. 21 is a diagram of the electrical circuit utilized in the machine when the pressing and jiggering mechanism is operated by the modified hydraulic system shown in Fig. 20.

Referring more particularly to the drawings and especially to Figs. 1, 3, 4, 5, and 6, the machine comprising the present invention includes two substantially duplicative sections 20, 20 each having a circular base 21, 21, one side of which is provided with a flat surface, the flat surfaces of the sections disposed in engagement with one another and secured by bolts or other fastening means. The base members 20, 20 receive and support upper housing sections 23, 23 which are slightly more than semi-circular when viewed in plan, the flat sides of these sections also being disposed adjacent one another. These flat sides are spaced to provide a recess for the reception of the lower portion of a conveyor, designated generally by the numeral 24. As the machine sections are duplicated, only one has been shown in detail and only this one will be described. Each machine section 20 includes a pair of telescopic shafts 25 and 26, the latter being tubular to receive the former. Shaft 25 is journaled at its upper and lower ends as at 27 and 28, respectively, while shaft 26 is also journaled in the top wall of the upper section and bearings carried by the top wall of the lower section. The mounting for these shafts thus permits their rotation relative to the base and one another. In the operation of the machine, shaft 26 is continuously rotated through the provision of a worm and worm wheel, 30 and 31. The worms 30 are carried by a shaft 32 which extends diagonally across the base section and is journaled in bearing 33 therein. One end of the shaft 32 extends to the exterior of the base and is provided with a pulley for the reception of belts by which motion is transmitted to the shaft. When shaft 32 revolves, the worms 30 transmit such rotary movement to the worm wheels 31 which in turn transmit this movement to the shafts 26. Each shaft 26 is provided adjacent its lower end with a gear 35 disposed in meshing engagement with a similar gear 36 secured to an idler shaft 37. This idler shaft, also, is provided with the driver section 38 of a Geneva transmission employed to impart intermittent movement to the shaft 25, the star wheel 40 of the Geneva transmission being secured to the lower end of the shaft 25. These Geneva transmissions, shown in Fig. 5, operate in the usual manner and each is provided with a star wheel having six slots to receive the pin of the driver. The shaft 25 of each machine section is, therefore, caused to rotate step by step through one revolution while the shaft 26 makes six complete revolutions. By intermittently rotating the shaft 25, a horizontal carrier secured to the upper end thereof is indexed to successively present each of six mold receiving recesses thereon to each of a plurality of stations. During each period of rest of the carriers 41, two of the mold receiving recesses are disposed over the open space between the machine sections. At this time the conveyor 24 operates to deposit an empty mold in one of the mold receiving recesses and remove a charged mold from the other recess.

As illustrated in Fig. 2, the conveyor comprises an endless chain 42, to spaced links of which are secured outwardly projecting pins 43. Bars 44 are pivotally supported by the pins 43, these bars carrying outwardly projecting fingers 45 at their lower ends. The outer extremities of the fingers 45 are formed with rings 46 to receive the molds 47 on which the clay articles are formed. The chain 42 is trained around a sprocket 48, keyed or otherwise secured to a shaft 49. This shaft is journaled in bearings 51 carried by the inner side walls of the base sections 23. One end of the shaft 49 has a bevel gear 52 secured thereto, this gear meshing with a bevel pinion 53 which rotates in unison with the shaft 26. Since this shaft rotates continuously, similar continuous rotation will be imparted by the gears 53 and 52 to the shaft 49 and sprocket 48. The chain 42 will, therefore, move continuously in timed relation to the operation of the machine sections. After an empty mold has been deposited on the carrier 41, this member moves to a station with which a clay feed pipe 54 registers. As indicated in Figs. 1 and 6, two of these feed pipes are provided for each machine in order that the machine can be continuously operated, the clay being fed through one tube while the other one is being recharged and vice versa.

The clay feeding mechanism is arranged on a floor or balcony above the ware-forming machine proper and comprises a pair of substantially duplicate units. Each unit includes a hydraulic power cylinder 55, 55A, a clay magazine 56, 56A, and connecting tubular sections 57, 57A, and 58, 58A, the latter being elbow shaped in form. As illustrated in Figs. 7, 8, and 10, both fluid power units 55, 55A, and magazines 56, 56A, are supported on rollers 60 and 61 to permit longitudinal movement thereof toward and away from the tube sections 57, 57A. The clay magazines are secured to the power units and connector tube sections 57, 57A, by clamps 62 of the type shown in Figs. 10 and 11. These clamps include pivoted sections 63 and 64 and a U-shaped bail 65 which is pivotally secured to the clamp section 63. When the clamp is operatively positioned, the sections 63 and 64 are swung toward one another, the bail 65 is swung over the end of section 64 and a set screw 66 is tightened against an abutment on the section 64. The ends of the sections 63 and 64 are thus drawn toward one another which causes inclined surfaces 67 on the inner sides of the clamp sections to slide on similar surfaces 68 formed on collars 70 surrounding the mating ends of the power units, magazines and connecting tubes and force the adjoining ends of these members into leakproof engagement.

After the magazine of one feed unit has been emptied of clay, the power cylinder of the other feed unit is started to force clay from the magazine previously connected therewith. Due to the particular hydraulic system employed, the changeover from one clay feed unit to the other is automatic, the plunger of the exhausted magazine being withdrawn to permit the removal of the empty magazine and the installation of a full one.

The hydraulic system for operating the dual clay feeding units is shown in Fig. 13. This system includes the power cylinders 55, 55A of each unit, a battery of four-way valves 71, 72, and 73, a pressure building valve 74, motor driven pumps 75 and 76, pressure operated tripping valves 77 and 78, relief valves 80 and 81 and tubing to properly connect these elements. Pump 75 draws fluid, preferably oil from a reservoir 82 through line 83 and delivers the same via line 84 to the pressure building valve 74. From this valve, the fluid flows through line 85 to the inlet of four-way valve 72. When the spool 86 of this valve is in the position shown in Fig. 13, the fluid under pressure is directed through line 87 to the rear end of power cylinder 55. This fluid forces piston 88 in the cylinder 55 forward which motion is transmitted by rod 90 to plunger 91 which engages and propels the clay from the magazine 56. During the forward movement of piston 88, fluid is discharged from the forward end of the power cylinder 55 through line 92 to one of the cylinder ports of four-way valve 71. At this time spool 93 of valve 71 is positioned to connect line 92 with another line 94 extending to the reservoir 82.

The flow of fluid under pressure through line 87 to power cylinder 55 causes the clay in magazine 56 to be expelled through tubes 57, 58 and 54 to the forming machine, suitable cut-off mechanism 89 being provided to sever the clay extruding from tube 54 into bats of the necessary thickness. When the magazine 56 has been substantially emptied, piston 88 engages the end wall of the cylinder and pressure builds up in line 87 until it is sufficient to trip valve 77 which is connected with such line by line 95, and flow through line 96 to the right-hand end of four-way valve 73. This pressure shifts the spool 97 of valve 73 to the left where it will connect a line 98 leading from pump 76 to a line 100 which extends to the left end of valve 71. Fluid flowing from the pump 76 through the line 100 to valve 71 causes the spool 93 to move toward the right where it will connect a line 101 leading from pump 76 to line 92 which extends to the forward end of the cylinder 55. Fluid flowing by this path to cylinder 55 causes the piston 88 to move rearwardly and draw plunger 91 out of magazine 56 so that it may be removed and a full magazine inserted in its place.

Some of the fluid flowing through line 100 is directed through a branch 102 to the right-hand end of valve 72 to cause spool 86 to move to the left where fluid supplied by pump 75 will be directed through line 103 to rear end of power cylinder 55A, the fluid serving to move piston 104 forwardly and cause similar movement of plunger 105 connected therewith. This plunger operates to expel plastic clay from magazine 56A in the same manner that piston 88 expelled clay from magazine 56. During forward movement of piston 104, fluid is discharged from the front portion of cylinder 55A through line 106 to the second cylinder port of valve 71 which fluid is directed by this valve to the reservoir.

When approximately all the clay in magazine 56A has been discharged, piston 104 will engage the forward end wall of cylinder 55A causing fluid pressure to increase in line 103. This increased pressure will be transmitted by branch 107 to trip valve 78 and will operate this valve to cause fluid under pressure to flow to the left end of valve 73. This fluid will shift spool 97 to the right end of the valve 73 wherein fluid from pump 76 will be directed through line 108 to the right and left ends of valves 71 and 72, respectively. The admission of fluid pressure to these valves in this manner again directs fluid from pump 75 to cylinder 55 to cause it to resume operation and connects the rear end of cylinder 55 to tank. It also connects line 106 with pump 76 and line 103 with the reservoir thus causing reverse movement of piston 104 and plunger 105 so that empty magazine 56A may be removed and a full magazine substituted therefor.

As shown in Fig. 12 the plungers 91 and 105 are provided with valves to eliminate suction on their return strokes. Such strokes are performed more rapidly than the forward strokes in order that a full magazine may be substituted for an empty one before the other magazine is emptied.

The pressure building valve 74 is connected in the system between pump 75 and valve 72 and is operative to maintain the volumetric delivery of pump 75 constant at all times whereby the rate of extrusion from tubes 54 and 54A will remain constant. As indicated in Fig. 14, valve 74 includes a casing 110 having a bore 111 for the reception of a spool 112 which controls communication between lines 84 and 85 leading to and from bore 111. Spool 112 has a piston extension 112A which slides in a socket 113 constituting a continuation of the bore 111, the socket being connected by passage 114 with the inlet pipe 84. Spool 112 is provided with a socket 115 which registers with a similar socket 116 formed in a cap 117 employed to close the open end of the casing 110, the sockets 115 and 116 receiving a coil spring 118 which tends to urge spool 112 to a position to prevent communication between lines 84 and 85. The force of the spring 118 must be overcome by the fluid applied to the end of extension 112A before communication can be established, therefore, the spring serves to build up the pressure and cause it to be maintained. A thumbscrew 120 is provided to adjust the spring 118 and thus vary the pressure secured by the valve 74.

Fluid lines 121 and 122 branch from lines 100 and 108 and are connected with opposite ends of a small power cylinder 123 used to adjust and synchronize the operation of the cutoff mechanism 89 for the clay, with the operation of the forming machines so that the bats severed from the feed tubes will be properly positioned on the molds.

The cut-off mechanism 89, indicated generally in Fig. 1, may be of any suitable type which will operate to sever the bats from the descending clay column and deposit the same on the molds. The clay feed tubes 54 and 54A are disposed in vertical registration with the first two stations of the table 41 following the loading station where the empty molds are deposited by the conveyor 24. As the feeding units are alternately operated, the molds may receive the clay bats at either station after which they will be advanced to the third station disposed beneath and in vertical registration with a pressing head 124.

The head 124 has a die 125 with which the clay bats on the molds are forcibly engaged to be given the general shape of the finished article. Die 125 is held stationary during the pressing operation, the molds being elevated from the carrier table 41 and moved into contact with the die by a power cylinder designated generally by the numeral 126. This power cylinder is shown more in detail in Fig. 17.

In the present embodiment of the invention, the power cylinder 126 includes a body 127 of generally cylindrical form disposed with the longitudinal axis thereof extending vertically. A flange 128 is provided at the lower end of the body for engagement with a flange 129 surrounding an opening 130 formed in the top wall of the base 21. Suitable securing means 131 are employed to maintain the position of the body. A chamber 132 extends longitudinally of body 127 to slidably receive a piston 133, the end portions of the chamber stationarily receiving sleeve-like members 134 which serve as guides for piston rods 135 projecting from the upper and lower ends of the piston 133. End caps 136 close the ends of the chamber 132 and hold the guides 134 in position, the caps being provided with packing rings 137 to strip fluid from the rods during movement of the same out of the chamber.

As illustrated in Fig. 3, the upper end of the upper piston rod 135 is connected with the lower end of a push rod 138 disposed for vertical sliding movement in a bearing 140 carried by the horizontal top wall of the base section 23. At its upper end, the rod 138 is connected with an adaptor 141 to which is secured a recessed plate 142. This plate is lined with resilient material 143 so that when the plate is engaged with a mold 47, the latter will be protected from injury. As shown in Fig. 1, the table-like carriers 41 are provided with a plurality of circularly shaped recesses 145 which open to the outer edge of the table. These recesses 145 are disposed at the stations of the table between the periods of movement of the latter. When the tables are at rest, the power cylinder 126 operates to move the adaptor 141 and its plate 142 upwardly through the recess 145 located in registration therewith carrying with it the mold which was disposed in the recess. Continued operation of the power cylinder serves to move the mold upwardly until the clay bat thereon is forced into engagement with the die 125. The power cylinder 126 is then operated to lower the mold to its recess 145 on the carrier 41 for advancement to the next station. Of course, the power cylinder continues to operate after the mold has been positioned on the carrier until the recessed plate 142 is disposed out of the path of movement of the carrier 41. As considerable force is imparted to the mold in the pressing operation by the power cylinder 126, this member is braced at its lower end by a cup-shaped device 146 supported on the upper end of a threaded post projecting upwardly from the base member, the post being designated by the numeral 147.

It is desirable in the operation of the machine to avoid jerkiness or sudden starting and stopping in the movement of the mold to the pressing position. A control mechanism, designated generally by the numeral 150, has been provided to control the operation of the power cylinder 126. This control mechanism is illustrated in detail in Figs. 16 and 17. It comprises a body 151 supported on the power cylinder by a bracket 152. The body 151 has a longitudinally extending bore 152 extending therethrough which bore intersects a plurality of longitudinally spaced chambers 155 to 159 inclusive. Chamber 155 is located adjacent the central portion of the bore 153 and is connected with a source of fluid under pressure by line 161. Chambers 156 and 157 are disposed on opposite sides of the chamber 155, the former being connected by line 162 with the lower end of the chamber 132 while the latter is connected by tube 163 with the upper end of said chamber. The chambers 158 and 159 are located on the outer sides of the chambers 156 and 157, these outer chambers being connected by a passage 164 which is in turn connected by a tube 165 with the exhaust. The bore 153 slidably receives a sleeve 166 which is provided at spaced intervals with radial ports registering with the chambers 155 to 159. Sleeve 166 slidably receives a spool 168 which is formed with spaced grooves 170 and 171 employed to connect certain of the chambers 155 to 159. Sleeve valve 166 is closed at one end by a wall 172 in which is formed a socket 173 for the reception of a coil spring 174, this spring engaging the inner end of the spool 168. The tendency for the spring 174 to expand tends to cause relative movement between the sleeve and the spool which movement is precluded except at desired times by cam members 175 and 176 engaging rollers 177 and 178 journaled in the outer ends of the sleeve 166 and spool 168, respectively. Normally, the sleeve and the spool are so positioned relative to one another that a land 180 between the grooves 170 and 171 precludes communication between the chamber 155 and the interior of the sleeve 166. The unreduced portions of the spool 168 at the outer ends of the grooves 170 and 171 also block ports in the sleeve extending to the chambers 158 and 159. When the parts are thus positioned, no fluid flow to or from the chamber 132 can take place. The piston 133, therefore, will be maintained in its present position.

The front end of the body 151 is closed by a cap 182 which carries a packing ring 183 of resilient material employed to strip hydraulic fluid from the sleeve 166 during its movement out of the body 151. The opposite end of the body is closed by a fitting 184 having an opening 185 through which the outer portion of the spool 168 projects. This opening communicates at its outer end with a vertically extending opening 186 through which a rod 187 is adapted to move. This rod carries the cam 176 and is connected at its upper end by an arm 188 with the piston rod 135. Thus, when the piston 133 moves in the power cylinder, similar motion will be imparted to the rod 187 through the arm 188. The upper and lower ends of the opening 186 communicate with the interior of cap shaped members 190 and 191 respectively. Member 190 has an opening at its upper end through which the rod 187 projects, this opening being provided with resilient packing 192 used to strip hydraulic fluid from the rod 187 as it moves out of the member 190. Normally, the lower member 191 is filled with hydraulic fluid to maintain the rod 187 lubricated for sliding movement in the fitting 184. As will be apparent from Fig. 17, the cam member 176 is of wedged shaped form and in this instance the wedge is so arranged that the widest portion thereof is at the lower end of the rod 187; thus, when the piston 133 moves in an upward direction the cam 176 will cause the spool 168 to move inward in the body 151. It will be apparent, of course, that the piston 133 cannot move until fluid under pressure is supplied to the lower end of the chamber 132. To provide for the admission of pressure to the lower end of chamber 132 sufficient relative movement between sleeve 166 and spool 168 must take place to connect port 156 with the inlet port 155 and port 157 with the outlet port 158. This relative movement is secured through the movement of sleeve 166 by spring 174 and cam 175 as the latter revolves in unison with shaft 26. When cam 175 moves from the position shown in Fig. 16, spring 174 will cause sleeve 166 to move toward the right while spool 168 is held in the position shown. This relative movement establishes communication between the ports in the sleeve registering with groove 155, and the groove 171 and fluid under pressure may then flow from line 161 and groove 155 to groove 156 and line 162 leading to the lower end of chamber 132. The force of this fluid tends to urge the piston 133 in an upward direction and to discharge fluid from the upper end of chamber through line 163 and grooves 157, 170, ports registering with groove 158 and outwardly through line 165 to the fluid reservoir.

From Fig. 17, it will be observed that as piston 133 moves in an upward direction, cam 176 will also move upwardly and the inclined surface thereof will cause spool 168 to be moved toward the right which movement will tend to interrupt the flow of fluid to and from the lower and upper ends of chamber 132. The speed of movement of the piston 133 and the mechanism operated thereby may thus be automatically controlled, the shapes of the cams determining the degree of opening of the valve and, consequently, the speed of movement of the piston. It will be apparent, from Fig. 16 and the foregoing description, that, since spool 168 has movement imparted thereto by movement of the piston 133, it is necessary that the sleeve 166 be moved before motion can be imparted to the piston 133 through the admission of fluid to the lower end of chamber 132. It will also be apparent that sleeve 166 must move outwardly of body 151 or toward the right as viewed in Fig. 16. To secure this motion, cam 175 must be so formed that, during initial rotation of the shaft 26, the surface of the cam will move away from the body 151 allowing spring 174 to expand and force sleeve 166 toward the right to maintain the roller 177 in contact with the surface of the cam. As soon as fluid under pressure flows into the lower end of chamber 132, the piston 133 will start its upward movement imparting similar movement through arm 188 to rod 187 and cam 176 which will cause spool 168 to follow sleeve 166. The cam 175 is so formed that a uniformly accelerated and decelerated motion will be imparted to piston 133. After the bat has engaged the die, pressing force will be continued for the required time, the shape of the cam 175 being such as to maintain communication between the inlet port 155 and the lower end of the chamber 132. After the necessary time has elapsed, the rotation of shaft 25 will cause cam 175 to force sleeve 166 into body 151 to interrupt communication between grooves 155 and 156 and between grooves 157 and 158. Piston 133 and the mechanism carried thereby is lowered by supplying the upper end of chamber 132 with fluid under pressure and connecting the lower end of this chamber with the reservoir. These operations are secured through the continued movement of the sleeve 166 toward the left, as viewed in Figs. 16 and 17, until the ports in registration with inlet groove 155 are opened to groove 170 in spool 168 and ports registering with outlet groove 159 are opened to groove 171 in this spool. When these ports are so positioned, fluid under pressure is supplied to the upper end of chamber 132 and piston 133 will start to move in a downward direction. This movement of the piston imparts similar movement to cam 176 which in turn permits spring 174 to move spool 168 to the left to regulate the degree of communication between grooves 155 and 170 and between grooves 159 and 171. The speed of descent of piston 133 is thus controlled in the same manner as the speed of elevation. The admission of fluid under pressure to the upper end of the chamber to cause the piston 133 to descend moves the mold with the bat thereon away from the die and deposits the same on the table 41 for advancement to the next station.

Figure 15:
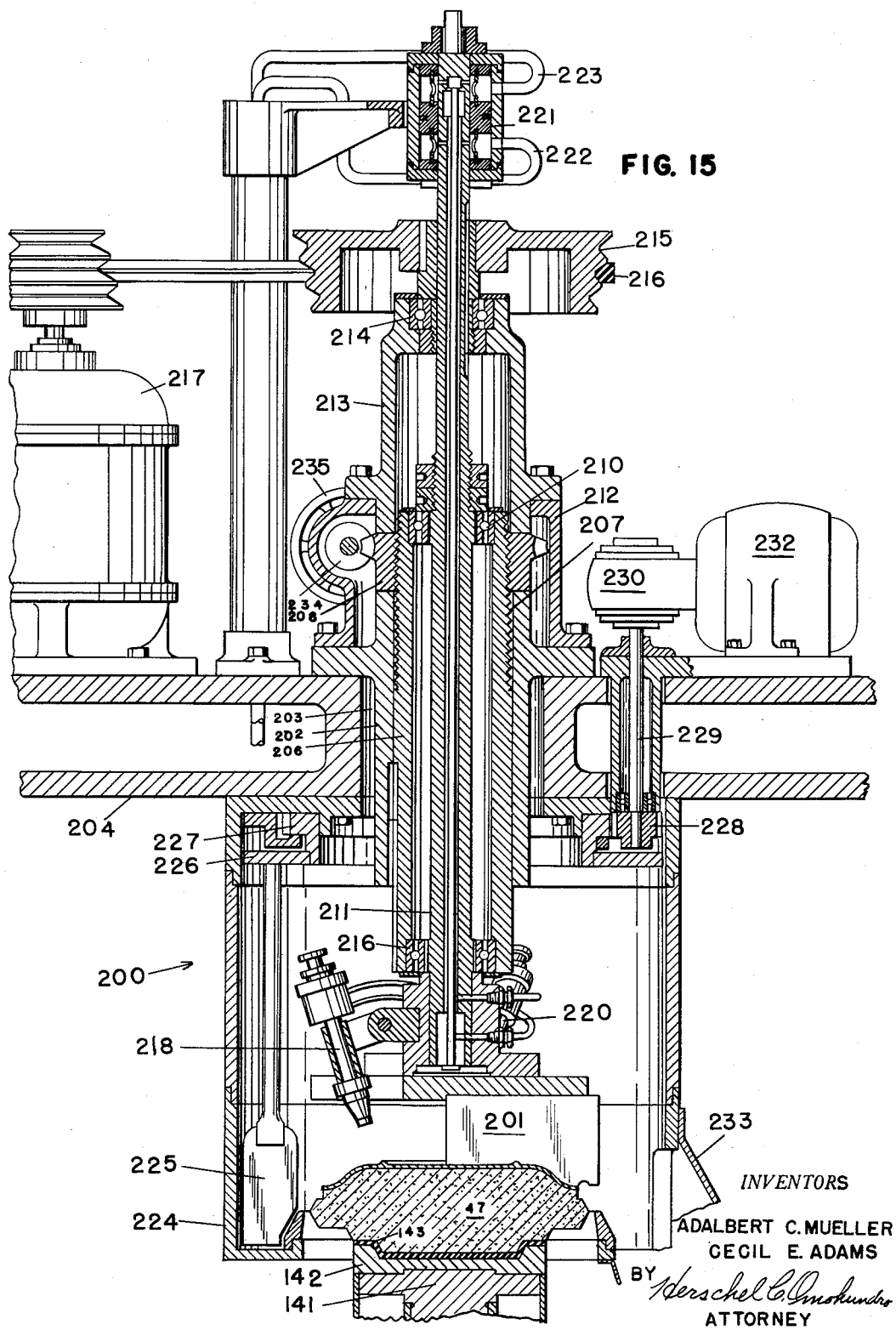
Fig. 15 is a detail vertical longitudinal sectional view taken through jiggering mechanism provided on the machine shown in Fig. 1.

At this station the clay bats are moved into engagement with a jiggering head indicated generally by the numeral 200. This head is also spaced above the table 41 and the molds with the bats thereon are moved upwardly to a position wherein the bats may be operated upon by one or more rotatable scraper blades 201, a power cylinder of the type shown at 126 also being used to move the molds and bats toward and away from the jiggering head. The mechanism for performing the jiggering operation may be of any type, one such mechanism being illustrated in detail in Fig. 15. The mechanism shown in Fig. 15 includes a sleeve 202 which projects downwardly through a hole 203 formed in a shelf 204 supported over the rotatable table 41 by columns 205. A second sleeve 206 is keyed for longitudinal sliding movement in the sleeve 202 and one end is threaded as at 207 for cooperation with a similarly threaded adjusting ring 208. The ends of the sleeve 206 receive anti-friction bearings 210 which serve to rotatably support a hollow shaft 211 to the lower end of which the blades 201 are secured. The housing 212 is disposed around the upper end of the sleeve 202 and ring 208 and this housing is surmounted by a second housing section 213 which also supports an anti-friction bearing 214 at its upper end, this anti-friction bearing also serving as a journal for the hollow shaft 211. The upper end of the shaft 211 has a set of pulleys 215 secured thereto to receive a V-belt 216 employed to transmit rotary motion from a motor 217 mounted on the shelf 204 to the shaft 211. When the motor 217 is operated, rotary motion will be imparted by the belt and the pulleys to the shaft 211 which will revolve and impart through the scrapers 201 secured thereto a scraping action on the clay bat supported in contact with the members 201.

When the bats are scraped in this manner, waste material is separated therefrom and this material must be removed from the bat. To effect this operation, air or water, or both, may be directed against the ware in jet form by means of nozzles 218 and 220 also supported on the lower end of the shaft 211. Fluid is conducted to these nozzles through the interior of the shaft and a tube supported therein. A swivel 221 surrounds the upper end of the shaft 211 and serves to admit air and water to the interior of the shaft and the tube from a pair of tubes 222 and 223 extending from suitable sources of supply. As the scrapers 201 revolve, the waste will be thrown by centrifugal force into a trough 224 surrounding the lower portion of the jiggering head. The trough also surrounds the mold 47 and the bat when the same is elevated for the jiggering operation. A scraper 225 is suspended from a ring-like member 226 which is secured to a ring gear 227 supported for rotation around the lower end of the opening 203 in the shelf 204. This motion is imparted to the ring gear by a pinion 228 secured to the lower end of a vertical shaft 229 projecting from a gear case 230 carried by an electric motor 232, this motor being mounted on the upper surface of the shelf 204. When the motor 232 is operated, rotary motion will be imparted by the shaft 229 to the pinion 228 which in turn will cause the ring gear 227 to revolve carrying with it the member 226 from which the scraper 225 depends. As this member moves along the trough 224, it will scrape the waste from the bottom and sides thereof and cause it to be discharged through a chute 233 to a suitable receptacle not shown. The housing 212 has a worm 234 journaled therein for cooperation with teeth provided on the member 208 to effect the vertical adjustment of the sleeve 206. Rotary movement is imparted to the worm 234 by an exteriorly disposed hand wheel 235. This means serves to effect the raising and lowering of the scrapers 201 whereby the thickness of the final ware may be determined. When the scraping operation has been completed, the mold 47 with the bat thereon will be lowered into position on the carrier 41 which will then move the mold to the next station for removal by the conveyor 24. The cycle of a mold through a ware-forming machine is thus completed.

As shown in Fig. 1 and as previously mentioned, the machine 20 is composed of two duplicative sections. Each section has a station where the conveyor deposits the empty molds, two stations where clay is alternately applied to the molds, pressing station, a jiggering station and a station where the formed articles are removed with the molds by the conveyor. The molds are removed from the table for forming and jiggering operations only at the pressing and jiggering stations. Each of these stations is provided with a power cylinder 126 for elevating the mold into the forming position. The power cylinders 126 are automatically operated and are connected in a hydraulic system shown diagrammatically in Fig. 18. This system may be of many different types but the one selected for illustration supplies a relatively high pressure to the power cylinders used in the pressing operation and a lower pressure to the cylinders at the jiggering stations. The system shown in Fig. 18 includes reservoir 250, which is in the form of a tank, which also serves as a base for an electric motor 251. Each end of the armature shaft is connected with a hydraulic pump 252 and 253. These pumps may be of any suitable type but one thereof must be capable of generating high pressure. The hydraulic system shown in Fig. 18 is substantially two hydraulic systems arranged in parallel, the pumps thereof being operated by a single motor. Pump 252 is arranged in a hydraulic circuit including the power cylinders 126 for operating the pressing devices. The other hydraulic circuit, including pump 253, supplies fluid under pressure to the power cylinders 126 used in elevating the clay bats to the jiggering mechanism. Both of these systems include an inlet line 254 extending from the reservoir to inlet of the pumps, the lines 254 containing strainers 255. Outlet lines 256 extend from the pumps to relief valves 257, check valves 258 being arranged in lines 256 to prevent reverse flow of the fluid. From the relief valves 257, fluid flows through lines 260 to solenoid operated by-pass valves 261 from which lines 262 and 263 extend to the reservoir and an accumulator 264 respectively. Outlet lines 265 extend from the reservoirs 264 to the control valves 150 of the power units. The lines 265 contain check valves 267 to prevent the flow of fluid back to the accumulators. In Fig. 18 only the power cylinders for one section of the machine have been illustrated but it will be obvious that each section of the hydraulic system will have two or more of such power cylinders depending upon the number of machines serviced by the hydraulic system or the number of pressing and jiggering stations on each machine.

The accumulators 264 have pistons 268 disposed for movement therein in response to the accumulation of hydraulic fluid. The spaces in the accumulators above the pistons 268 receive air or other fluid employed to preload and apply pressure to the pistons to force the hydraulic fluid from the accumulators. The high pressure section of the hydraulic system has a cylinder 270 of compressed gas connected with the upper end of the accumulator to initially charge the same with counter-balancing pressure. The upper end of the container 270 is equipped with a regulator 271 from which a line 272 extends to the upper end of the accumulator 264. Valves 273 and 274 are disposed in the line 272 and an outlet branch 275 thereof to control the entrance of the air or other compressed gas into and out of the upper end of the accumulator. The low pressure section of the hydraulic system may also be supplied with a container of compressed air or other gas for preloading the upper end of the accumulator in this section of the system or, if desired, such accumulator may be connected with a suitable source of compressed air. In any event, a regulator 271 is necessary to maintain the proper pressure in the upper end of the accumulator. Both sections of the hydraulic system are automatic in operation, that is, the power cylinders will only be operated when the proper ratio of fluids under pressure obtains on the opposite sides of the pistons or diaphragms 268 in the accumulators 264. To effect this control, an electrical circuit, such as that illustrated diagrammatically in Fig. 19, is employed. This electrical circuit includes a number of switches and solenoids which are actuated by elements in the hydraulic system, or, conversely, they actuate elements in the hydraulic system themselves. Certain of the switches or solenoids are employed to secure the proper sequence of operations of the various parts of the machine. These will appear as the description proceeds.

As illustrated in Fig. 18, the piston or movable diaphragm of each accumulator has a rod 278 projecting therefrom which rods are provided adjacent the outer end with a cam shaped enlargement 280. These enlargements serve to actuate switches 281 to 288 inclusive. The switches bearing the odd numbers are actuated by the movement of the piston in the high pressure accumulator, while those bearing even numbers are actuated by the piston in the other accumulator. Switches 281 to 288 inclusive are termed "limit switches." Other limit switches 291 to 294 are also provided, these being disposed in positions to be actuated by the arms 188 of the power units when these elements move to their lowermost positions. The limit switches 292 and 294 which are actuated by the power cylinders on the second section of the machine are shown only in the diagram in Fig. 19. Another limit switch 295 is disposed adjacent one of the control valve actuating cams 175. During the operation of the machine, this limit switch serves to coordinate the operation of the various parts of the ware-forming machine, after the same has been shut down. As shown in Figs. 17 and 18, each control valve 150 is provided with a solenoid operated lock 296, the solenoids being numbered 297 to 300, inclusive. The solenoids 298 and 300 used in the operation of the second section of the machine are shown only diagrammatically in Fig. 19. The solenoids for the by-pass valves 261 in the hydraulic system are designated by the numerals 301 and 302.

In addition to the limit switches and solenoids previously mentioned, the electrical circuit, as shown in Fig. 19, includes a plurality of relay and solenoid operated switches for interlocking the operation of the table and conveyor operating motor, the motors for the hydraulic system of the clay feed and the motor for the hydraulic system of the pressing and jiggering mechanism. When no current is flowing through the electrical system, certain of the switches or contacts will be normally opened while others will be normally closed. Fig. 19 illustrates the circuit with the switches or contactors in their normal positions when no current is flowing in the circuit. In Fig. 19 only those portions of the electrical circuit for the machine motor and the clay feed motor have been illustrated which are necessary to clearly indicate the interlock between the various machines or parts thereof. In the electrical circuit, the characters L1, L2, and L3 designate the power lines. Leads 303, 304 and 305 extend from these lines to contacts of a relay switch designated generally by the numeral 306. The other contacts of this switch are connected by leads with the motor 251. The lines L1 and L3 are also connected with the primary side of a transformer 307 which steps the voltage down for use in the major portion of the electrical circuit. The operation of switch 306 is controlled by a relay switch 308 which includes spaced contacts 309, a contactor bar 310, start and stop switches 311 and 312, and a coil 313. This control circuit is connected with the secondary of the transformer 307 in the manner shown in Fig. 19 so that, when the switch 311 is closed, the circuit will be completed to the coil 313 which, when energized in this manner, closes switch 308 which also completes the circuit for the coil 313. The start button 311 may then be released. When coil 313 is energized, switch 306 is also closed to supply current to the motor 251.

The electrical control circuit also includes two relay circuits having five sets of contacts each. These sets of contacts are designated by the numerals 315 to 324 inclusive. The odd numerals are arranged in one relay circuit and the even numerals designate contacts in the other relay circuit. The coils of these relays are designated by the numerals 325 and 326. The coils 325 and 326 are arranged in parallel branches which are supplied with current from the secondary of the transformer 307 through a line 327 in which a relay switch 328 is disposed. The branch circuit is completed by a line 329 extending from the coils 325 and 326 to the secondary of transformer 307. The line 329 also contains the switch 308. The flow of current to the coils 325 and 326 can only be secured by closing switch 328 through the energization of a coil 330 which is disposed in the electrical circuit for the motor 331 employed to operate the ware-forming machine and the conveyor. This circuit includes motor start and stop switches 332 and 333, respectively, the coil 330 and an electro-magnetic switch 334 which includes a coil 335. The motor 331 is started in operation by closing the switch 332 to initiate current flow through coil 335.

This current flow attracts the core of the switch 334 and closes the contacts thereof. The switch 332 may then be released. Since switch 334 is closed, current will continue to flow through coil 335 which will in turn maintain switch 334 closed. Current will also flow through coil 330 and effect the closure of switch 328. Current is still prevented from flowing from the secondary of transformer 307 through the coils 325 and 326 because the branches of the circuit, including these coils, contain switches 337 and 338 which are normally open, that is, when current is not flowing through the circuit. Switches 337 and 338 are controlled in operation by coils 341 and 342, respectively, which are arranged in circuit branches 343 and 344 containing spaced sets of contacts 321 and 322 controlled in turn by coils 325 and 326. The circuits 343 and 344 also include the limit switches 285 and 286, respectively. Coils 341 and 342 also control normally closed switches 345 and 346. These switches are arranged in branch circuits 347 and 348 containing switches 351 and 352 and coils 353 and 354. In addition to governing the operation of the switches 351 and 352, the coils 353 and 354 serve to operate normally closed switches 355 and 356 which are arranged in parallel branch circuits 357 and 358 including the spaced pairs of contacts 319 and 320, respectively, the contacts of each pair being normally connected when the coils 325 and 326 are de-energized. Branch circuits 357 and 358 are directly connected with the current supply lines L1 and L3 when the manual switch in line 303 is closed. Circuit 357 includes limit switches 291 and 293 and a field coil of solenoid 301 of one valve 261 while branch 358 includes limit switches 292 and 294 and field coil 302 of the other by-pass valve 261. A synchronizing branch circuit, designated by the numeral 360, includes a magnetically operated switch 361, spaced sets of contacts 318 and 317 and a field coil 362 which controls the operation of the switch 361 and a second switch 363 disposed in a branch circuit including switches 315 and 316 as well as solenoids 297 to 300 inclusive. Switches 315 and 316 are controlled by coils 325 and 326. These coils also control the operation of switches 323 and 324 which are arranged in a circuit 364 controlling the operation of the motors 365 used to operate the pumps 75 and 76 in the clay feed hydraulic circuit. The circuit 364 also includes start and stop switches 366 and 367, the magnetic switch 368 and the coil 370. The coil 370 will not hold the switch 368 closed until the switches 323 and 324 are also closed. The clay feed mechanism is thus interlocked with the pressing and jiggering mechanism, the former depending upon the operation of the latter for its operation.

Power cylinders 126 are inoperative when the machine is shut down and the pistons 133 will be in their lowermost positions as will also the cam rod 187 and cams 176. At this time, the spool 168 of each control mechanism 150 will be fully retracted and the sleeve valve 166 of each control unit will be at its innermost position where it will be held by the solenoid operated lock 296, this lock being spring-pressed to operative position when the solenoid is deenergized. Since the locks 296 hold the sleeves 166 in their innermost position, no fluid will be supplied to the power cylinders 126 until the solenoids 297 to 300 inclusive, are energized.

The operation of the pressing and jiggering hydraulic circuit may be best understood by referring to Figs. 18 and 19. When the machine is to be operated, the regulators 271 are set for the desired pressures, valves 274 are closed and valves 273 opened to admit preloading gas to the accumulators 264 above the pistons 268. The motor start switch 332 is then actuated to initiate the operation of the machine and the conveyor. The closing of switch 332 energizes coil 330 which closes switch 328. This operation will have no effect, however, until either switch 337 or 338 is closed which cannot be done until the correct volume of fluid at the proper pressure is contained within the accumulator 264 in the corresponding section of the hydraulic system. To secure this condition, the switch 311 is closed to effect the energization of coil 313 which in turn closes switch 308 as well as switch 306 which controls current flow to the motor 251. As previously mentioned, when the machine is idle, the pistons of the hydraulic units 126 will be at their lowermost positions in which the arms 188 will be engaged with the switches 291 to 294, inclusive, to hold the same in closed positions. Also when the machine is idle, the enlargements 280 on the rods 278 extending from the accumulators will be disposed at the lower end of their travel at which positions they will hold switches 281 and 282 in closed positions. Thus when switch 308 is closed, current will flow through the line 327 through switches 281 and 282, coils 353 and 354, and switch 308 to energize the coils 353 and 354. Current will then flow through switches 345 and 346 and circuits 347 and 348 through switches 351 and 352 and coils 353 and 354 to hold switches 351 and 352 closed. When coils 353 and 354 are energized, switches 355 and 356 will be held in open positions to prevent the flow of current to the solenoid field coils 301 and 302. When these coils are de-energized, that is, coils 301 and 302, by-pass valves 261 will be in condition to direct fluid from the pumps 252 and 253 into the lower ends of the accumulators 264. When motor 251 is operated, the hydraulic fluid will be supplied to the accumulators causing the pistons 268 therein to move upwardly in opposition to the air or other compressible gas with which the upper ends of the accumulators have been preloaded.

The cam enlargements 280 will move away from switches 281 and 282 permitting them to open. But, since switches 351 and 352, 345 and 346 are closed, the branch circuits 348 and 347 will be unaffected. When sufficient fluid has been pumped into the accumulators 264 to raise the cams 280 to the position wherein switches 285 and 286 are actuated, the fluid supply will then be in the operating range. When switches 285 and 286 are closed, current will be supplied to the coils 341 and 342 to energize same. When these coils are energized, switches 345 and 346 controlled thereby will be moved to an open position thus discontinuing current flow through circuit branches 347 and 348. Coils 353 and 354 will be de-energized permitting switches 351 and 352 to open and switches 355 and 356 to close. Branch circuits 357 and 358 would then be completed except for the fact that, when coils 341 and 342 are energized, switches 337 and 338 operated thereby will be closed completing the circuits including coils 325 and 326. When these circuits are closed, all the switches controlled by coils 325 and 326 will be actuated. Among these switches are two normally closed switches 319 and 320 arranged in branch circuits 357 and 358.

When the coils 325 and 326 are energized, switches 319 and 320 will be opened to prevent the flow of current through branch circuits 357 and 358. When coils 325 and 326 are energized, another pair of switches 321 and 322 are closed which complete circuits, including the coils 341 and 342, thus maintaining the supply of current to the coils even though switches 285 and 286 may be opened. Switches 323 and 324 disposed in circuit 364 of the clay feed mechanism are also closed when coils 325 and 326 are energized. At this time, the clay feed mechanism may be started in operation by pressing the start switch 366 which initially energizes the coil 370 to effect the closing of the switch 368. Current may then flow through the circuit 364 and, as long as switches 323 and 324 are closed, coil 370 will be energized to maintain switch 368 in a closed position. The mechanism is now in position to start the ware-forming operations. The pressing and jiggering operations cannot be performed, however, until cam 175, which is provided with a switch actuating projection 375, moves to a position to actuate the limit switch 295. When this switch is closed, coil 362 will be energized thus closing switch 361. When switch 361 is closed, current may then flow through this switch, switch 318, switch 317, and coil 362 which will be continuously energized until current flow is discontinued by the opening of any one of the three switches in this circuit.

When coil 362 is energized, it will also close switch 363 and current may then flow through the circuit controlled by this switch which circuit includes switches 315 and 316 as well as solenoids 297 to 300. When the solenoids are energized, looking pins 296 will be withdrawn from the path of movement of the sleeves 166 in control valves 150 and these valves may then be operated by the cams 175. When the valves are so operated, fluid will be supplied to the power cylinders 126 of the pressing and jiggering mechanisms. The cams, of course, are so arranged on the shafts of the machine sections as to secure the proper sequence of operation.

In the event the volume of air in either accumulator should be excessively lowered for any reason, the piston in that accumulator will be elevated until the cam enlargement 280 actuated thereby engages the topmost limit switch identified in the high pressure circuit by the numeral 287 and by the numeral 288 in the lower pressure circuit. If either of these switches is actuated due to a low air volume, the circuit containing that particular switch will be opened, discontinuing the flow of current through the coils 325 or 326 disposed in the circuit. When either of these coils is de-energized, all the switches controlled thereby will be actuated. Let us assume, for example, that switch 287 is actuated due to a low air volume in the high pressure accumulator. When switch 287 is open, current flow will be discontinued through coil 325 permitting all the switches 315, 317, 319, 321 and 323 controlled thereby to be actuated to their normal positions. Switch 323 will be open, thus opening the circuit 364 for the clay feed mechanism. The clay feed will, therefore, be interrupted until the operating condition of the hydraulic system for the pressing and jiggering mechanism is restored. When switch 321 is open, coil 341 will be de-energized and switch 345 will close. Branch circuit 347 will be unaffected, however, since switch 351 is open. When the coil 325 is de-energized, switch 319 will close; switches 315 and 317 will open. The opening of switch 317 de-energizes coil 362 permitting switches 361 and 363 to open and prevent current flow through the circuit including solenoids 297 to 300. When these solenoids are de-energized, the control valves 150 will be locked in closed position after the cams 175 move the sleeves 166 into their innermost positions. The pistons in the power cylinders 126 will, at this time, be in their lowermost positions wherein switches 291 and 293 will be closed completing the circuit for the solenoid 301 of the bypass valve 261 in the high pressure system. When this valve is operated by the solenoid, the fluid supplied by pump 252 will be dumped to the reservoir 250. The accumulator will then be recharged with air or other compressible gas which will cause the piston 268 to descend until the cam 280 closes switch 281. This switch controls the initial flow of current ot coil 353 which actuates switches 351 and 355.

When coil 353 is energized, switch 351 will be closed and current may then flow through circuit 347 which includes the coil 353, switch 351 then being maintained closed regardless of the position of switch 281. Switch 355 will be opened when coil 353 is energized and current flow through branch circuit 357 will be discontinued. Solenoid 301 will then be de-energized, permitting valve 261 to connect pump 252 with the lower end of the accumulator 264. Fluid pressure will be built up in the accumulator causing the piston 268 to move upwardly which will in turn move cam 280 upwardly as in the initial operation. When the cam 280 again actuates switch 285, coil 341 will be energized as before to cause the closing of the switch 337 and the energization of the coil 325. All the switches controlled by this coil will be operated again as previously, switch 323 in the clay feed circuit being closed to place this circuit in condition for operation of the clay feed mechanism which may then be accomplished by closing the starter switch 366. When coil 325 is energized, switch 317 will be closed and, when switch 295 is again closed due to the rotation of the shafts in the machine sections, coil 362 will be energized to close switch 361. The circuit 360 will then remain energized even though switch 295 is opened. When coil 362 is energized, switch 363 is closed and current will flow through the solenoids 297 to 300, inclusive, placing the control valves 150 in operating condition. Operation of the pressing and jiggering mechanism may then be resumed.

If the air pressure in the low pressure section of the hydraulic system should be lowered excessively, the system will shut down and be recharged in the same manner just described in connection with the high pressure section of the system. In either event, the operation of the various pressing and jiggering mechanisms will be maintained in proper sequence, since they are always stopped at the same point of operation and are again started in the proper order. Switches 283 and 284 are so positioned as to cause a recharging of the respective accumulators if the fluid level therein should fall below that necessary for proper operation. When these switches are opened, the same recharging cycles of operation will take place as when switches 287 or 288 are opened.

With the circuit arrangement disclosed in Fig. 19, it is necessary to restart the clay feed mechanism by closing the starter switch 366 after either the high or low pressure section of the hydraulic system is recharged.

From the foregoing, it will be apparent that a wareforming machine has been provided which is fully automatic in operation, has hydraulically operated clay feed mechanism designed to maintain a constant supply of clay for continuous operation, has hydraulically operated means for pressing the ware and moving the same into jiggering position, these operations being performed at the maximum speed without affecting the quality of the finished ware and has the mechanism for performing the various operations so interlocked that, in the event of failure or incorrect operation of any one thereof, the operation of the others will be suspended until the condition causing the incorrect operation is remedied.

The hydraulic system for the power unit of the pressing and jiggering mechanism may be modified in many ways. For example, Fig. 20 shows a hydraulic system diagrammatically wherein the power units for the pressing and jiggering mechanism are operated by fluid at the same pressure. This system includes a single accumulator to which fluid under pressure may be supplied by either of a pair of motor-driven pumps. This modified hydraulic system is governed in operation by a modified electrical circuit illustrated diagrammatically in Fig. 21. This circuit is so arranged that either of the electrical motors for driving the hydraulic pump may be operated, the circuit including switch mechanism for preventing the simultaneous operation of the motors. The hydraulic system shown in Fig. 20 includes a reservoir 380 from which a pair of lines 381 and 382 extend to a pair of fluid pumps 383 and 384 which are driven by electric motors 385 and 386. Outlet lines 387 and 388 extend from the pumps 383 and 384 and are connected as at 390 to a fluid supply line 391. The lines 387 and 388 contain check valves 392 to prevent reverse flow of fluid therethrough when either of the pumps 383 and 384 are not in operation.

The supply line 391 is connected with a pressure relief valve 393 of conventional construction by which the pressure in the supply line 391 is prevented from exceeding a predetermined value. The line 391 also communicates with a solenoid operated valve 394 corresponding in function and operation to the solenoid valves 261 in the hydraulic system disclosed in Fig. 18, that is, to dump the fluid from the pressure system to the tank or reservoir preparatory to recharging the accumulator with oil and gas under pressure. The line 391 extends to the accumulator 395 which corresponds in function and operation to the accumulators in the hydraulic system shown in Fig. 18.

The accumulator 395 has a piston 396 disposed for movement therein which piston divides the accumulator into oil and gas pressure zones 397 and 398 respectively. The latter zone is connected by a line 400 with a compressed gas container 401, the line 400 being provided with a pressure regulator 402, a control valve 403, a check valve 404, and a bleeder valve 405. The latter valve may be utilized to permit the escape of gas from the zone 398 in the event too much gas is supplied to the accumulator. A piston rod 406 projects from a piston 396 and is provided with a cam enlargement 407 for operating each of a series of switches 408 to 411 inclusive. These switches are contained in the electrical circuit disclosed in Fig. 21 and function to control the operation of some of the electrical mechanism forming a part of the ware-forming machine, in response to variations in fluid pressure in the hydraulic system.

The fluid pressure supply line 391 extends to the inlet ports of the control valve mechanisms 150 employed to govern the operation of the power cylinders used in pressing and jiggering the ware. In the machine illustrated in the drawings, two of these power units are provided for each section, thus making four power units. A control valve mechanism 150 is provided for each of the power units. The power units 126 in the hydraulic system shown in Fig. 20 operate in the same manner as the corresponding power units in the hydraulic system shown in Fig. 18. The fundamental difference in the hydraulic systems shown in Fig. 18 and Fig. 20 is that in the latter system a standby motor and pump are provided so that the system may be operated continuously, even though one of the pumps is required to be shut down for service or any other reason. By utilizing a single pressure system as shown in Fig. 20, the electrical system may be simplified since duplicate controls are eliminated. The hydraulic system shown in Fig. 20 includes also a motor driven pump 412 which automatically circulates the hydraulic fluid through a cooler 413 and back to the reservoir 380 in response to an increase in temperature. A cooling medium such as water is supplied through a line 414 to the cooler 413, a thermally operated valve 415 being disposed in the line 414 to regulate the flow of water therethrough in response to temperature variations in the oil flowing from the cooler 413.

The operation of the hydraulic system disclosed in Fig. 20 is controlled by an electric circuit disclosed diagrammatically in Fig. 21. The circuit shown in Fig. 21 governs the operation of the complete ware-forming machine. It is a single push button controlled circuit, that is, one push button switch serves to set the entire machine in operation. The circuit in Fig. 21 includes the ware machine motor 331, the clay feed motor 365, the motors 385 and 386 for the pressing and jiggering mechanism hydraulic system, and the circulating pump-motor 412 for the hydraulic fluid cooling system shown in Fig. 20. Relay switches of the multiple contactor type are provided for each of the motors, the motor 331 having a controlling switch 334 and the motor 365 having a controlling switch 368 similar to that in the circuit shown in Fig. 19. Motors 385, 386, and 412 have similar control switches 416, 417, and 418, respectively. These switches operate in the same manner as the switches 368 and 334, that is, they contain field coils 420, 421 and 422 for closing the switches when the coils are energized. Coils 420 and 421 are disposed in circuits 423 and 424, respectively, each of these circuits including electro-magnetic switch means 425 and 426, the operations of which are controlled by coils 427 and 428. These coils are connected with switches 416 and 417, respectively, and each is connected in series with a normally closed switch 430 and 431, the operation of which is governed by the other coil. It will be seen that, when the master switch for either of the relays 416 or 417 is closed to supply the relay with current, the respective coil 427 or 428 will be energized to open the normally closed switch 430 or 431. If the master switch for relay 416, for example, is closed, coil 427 will be energized and normally closed switch 431 will be opened to prevent the flow of current through the coil 428. With this circuit arrangement, only one motor 385 or 386 can be operated at a time.

Coils 427 and 428 also control switches 432 and 433, respectively, to govern the flow of current to a transformer 434. The operation of the motors 331, 365, and 385 or 386 is interlocked by a plurality of switches 435, 436, and 437. The switch 435 forms a part of the relay 334 while two switches 436 are provided, one forming a part of each of relays 416 and 417. Switch 437 is governed in operation by coil 438 connected across the contacts of the relay 368. When the master switch for the relay 368 is closed, coil 438 will be energized to close switch 437. Switches 436, in relays 416 and 417, are connected in parallel so that, if either is closed, current may flow through the circuit in which switches 435 and 437 are disposed in series. This circuit also includes field coil 330 of relay switch 328 which coil will be energized when switches 435, 436, and 437 are closed. Before coil 330 can be energized, however, it is necessary to close the master switch for either relay 416 or 417 so that coil 427 or 428 will be energized to close switch 432 or 433 and complete the circuit to the transformer 434. After the primary of the transformer 434 has been energized, current may be initially supplied to the coil 330 by closing the start switch 332. This operation will effect the closing of switch 328 and current may then flow through line 440 to the field coil 420 or 421 of the relay 416 or 417, the master switch of which was previously closed. It will be remembered that, when the master switch of either relay 416 or 417 is closed, the respective switch 425 or 426 thereof will also be closed and, when switch 328 is closed, the circuit for the respective field coil 420 or 421 will be completed to effect the closure of the relay switch. Since the master switch of relay 334 was previously closed, the closing of switch 328 also supplies coil 335 of relay 334 with current and effects the closure of this relay switch to start motor 331. Since switch 435 is controlled by this relay 334, it will also be closed, thus completing a holding circuit for the switch 328 which circuit includes coil 330, either switch 436 and switches 437 and 435. Starting switch 332 may then be released and the operation of the ware machine will continue.

The electrical circuit also includes a multiple contact switch 441 having a field coil 442 and a pair of contacts 443 which control the flow of current to the coil 370 of relay switch 368. Until switch contacts 443 are connected and coil 370 is energized, no current will be supplied to the motor 365 for the clay feeding mechanism. To connect the contacts 443, coil 442 must be energized. This action is accomplished by a proper accumulation of fluid at the required pressure in the accumulator 398 to cause the cam enlargement 407 to close switch 409. At this time, coil 444 will be energized and will move switch 445 in the line 446 to a closed position which completes the circuit for the coil 442. The energization of this coil closes switch 443, completing the circuit for coil 370 to close relay switch 368 and initiate the operation of motor 365 for the clay feeding mechanism.

The electrical circuit further includes coordinating switch 295, previously mentioned, which is actuated by the main shaft of the machine when a predetermined point is reached in the cycle of operations. At this predetermined point, all of the power units of the pressing and jiggering mechanism will be in inoperative condition at the starting point of an operation. When switch 295 is closed with the parts of the electrical circuit in the condition set forth above, current will be supplied to coil 447 to close switch 448 which also completes the circuit for coil 447, thus maintaining the circuit closed even through switch 295 will open upon continued rotation of the main shaft of the machine. When coil 447 is energized, a second switch 450 will also be closed to complete the circuit 451 containing the field coils 297 to 300, inclusive, of the locks for the control valve mechanisms 150. Through the energizing of coils 297 to 300, control valves 150 will be released for operation and the pressing and jiggering steps of the cycle will commence in properly timed order.

The electrical circuit of Fig. 21 includes safety devices similar to those in the circuit shown in Fig. 19 which serve to discontinue the clay feeding, pressing and jiggering operation in the event excessive variations occur in the oil to gas pressure ratio in the accumulator 395. These safety devices comprise limit switches 408, 410 and 411 which are arranged to be actuated by the cam enlargement 407 during its movement by the piston 396 in the accumulator 398. If, for any reason, the gas volume in the section 398 of the accumulator 395 should fall below a predetermined value, cam enlargement 407 will engage and open limit switch 408 which is arranged in the circuit for coil 442 and interrupt current flow to this coil. Switch 443 will then be opened and current flow to the coil 370 of relay 368 will be interrupted permitting this switch to open and discontinue the operation of the clay feed motor 365. When the coil 442 is de-energized, another switch 452 will be opened which switch is disposed in circuit 451 containing coils 297 to 300, inclusive, of the locks for the control valves 150 of the pressing and jiggering power units 126. These locks will then be in condition to prevent operation of the control mechanisms 150 after they have been returned to initial starting position through the rotation of the shaft of the ware-making machine. Also when coil 442 is de-energized, switch 453 in the holding circuit for coil 444 will be opened permitting the de-energization of coil 444 and the opening of switch 445.

Relay switch 441 contains also a normally closed switch 454 which controls current flow through a circuit 455 including the field coil of solenoid valve 394, a plurality of limit switches 456 to 459, inclusive, and an electromagnetic switch 460. The limit switches 456 to 459 are disposed adjacent the power units 126, one being provided for each of the power units, and are so arranged that they will be closed when the pistons in the power units reach their initial or starting positions. Since switch 460 is normally closed, the closure of switches 456 to 459, inclusive, will complete the circuit for the solenoid valve coil 394; when this coil is energized, the hydraulic system will be directly connected with the reservoir and any fluid in the accumulator 395, as well as that being delivered by the pump, will be discharged into the reservoir. The gas in the compartment 398 will then force the piston 396 upwardly until it approaches the upper limit of its movement and cam enlargement 407 will engage and close switch 411 which is connected in a circuit containing the coil of magnetic switch 460. This circuit also includes a pressure switch 461 which is closed only when a predetermined precharge gas pressure is contained within the lower end of the accumulator. This pressure switch 461 prevents the introduction of fluid into the accumulator until the proper gas volume is supplied to the accumulator. After sufficient gas has been supplied to close switch 461 and switch 411 is closed, the coil 460A will be energized to open the switch 460 and interrupt the flow of current to the solenoid valve 394. Fluid then pumped to the system will be directed into the accumulator 395 causing piston 396 to move downwardly and compress the gas in the chamber 398. Switch 410 is of the normally closed type and after being passed by the cam enlargement 407 in its upward movement will re-close placing circuit 446 in condition to energize coil 442 when switch 445 is closed. This action will take place when the cam enlargement 407 in its downward movement reaches switch 409 and effects its closure to complete the circuit for coil 444 as previously described.

As long as the proper oil to gas ratio obtains in the accumulator 395, the cam enlargement will be disposed between switches 409 and 410. When coil 444 is energized, switch 462 is disposed in a holding circuit 463 for coil 460A will be opened permitting the de-energization of coil 460A. Circuit 463 includes the switch 464, the operation of which is controlled by coil 460A. When coil 460A is energized through the closing of switch 411 and switch 461, switch 464 will also be closed to complete the holding circuit for the coil 460A.

The operation of the coil circulating pump-motor 412 is controlled by a thermal switch 465 which may be located in the reservoir 380. When switch 465 is closed, current will be supplied to the coil 422 of the relay 418 causing the relay switch to complete the circuit for the motor 412. When the temperature is lowered sufficiently to open switch 465, coil 422 will be energized, permitting switch 418 to open and interrupt the operation of the motor 412.

While the form of embodiment of the present invention as illustrated constitutes a preferred form, it is to be understood that other forms might be adopted all coming within the scope of the claims which follow.

We claim:

1. Hydraulic apparatus for moving bat-supporting molds toward and away from forming mechanism comprising a fluid motor of the piston and cylinder type; means for supplying fluid under pressure to said cylinder to impart movement to said piston; a modified four-way valve between said fluid supplying means and said fluid motor, said valve having a body; a ported sleeve-like element disposed for movement in said body; a spool-like element arranged for movement in said sleeve-like element to control communication between certain ports therein; cam means operated by an extraneous source of power to move said sleeve-like element to initiate the operation of said fluid motor; a second cam means operated by said fluid motor to move said spool-like element relative to said sleeve-like element to control the rates and length of travel of said fluid motor, and lock means disposed to engage and retain one of said valve elements in position to interrupt the operation of said fluid motor.

2. Hydraulic apparatus for moving bat-supporting molds toward and away from forming mechanism comprising a fluid motor of the piston and cylinder type; means for supplying fluid under pressure to said cylinder to impart movement to said piston; a modified four-way valve between said fluid supplying means and said fluid motor, said valve having a body; a ported sleeve-like element disposed for movement in said body; a spool-like element arranged for movement in said sleeve-like element to control communication between certain ports therein; cam means operated by an extraneous source of power to move said sleeve-like element to initiate the operation of said fluid motor; a second cam means operated by said fluid motor to move said spool-like element relative to said sleeve-like element to control the rates and length of travel of said fluid motor; and lock means disposed to engage and retain said sleeve-like element in position to interrupt and prevent further operation of said fluid motor.

3. In a dinnerware making machine of the type having loading, clay feeding, pressing, jiggering and unloading stations; a support disposed for movement to transfer bat-receiving molds from station to station; driving means having a continuously rotating shaft and intermittent gear means to intermittently move said support to successively register molds thereon with said stations; hydraulic apparatus for moving the molds at the pressing and jiggering stations comprising piston and cylinder type fluid motors; means for supplying fluid under pressure to said cylinders to impart movement to said pistons; control valves between said fluid supply means and said fluid motors, each valve having a pair of relatively movable elements; motion transmitting means between said continuously rotating shaft and a movable element of each valve and between the other movable elements of said valves and the pistons of said fluid motors; and electro-responsive means cooperating with certain elements of said valves to interrupt the operation of said motors at predetermined stages of operation upon the occurrence of a selected condition.

4. In a dinnerware making machine of the type having loading, clay feeding, pressing, jiggering and unloading stations; a support disposed for movement to transfer bat-receiving molds from station to station; driving means having a continuously rotating shaft and intermittent gear means to intermittently move said support to successively register molds thereon with said stations; hydraulic apparatus for moving the molds at the pressing and jiggering stations comprising piston and cylinder type fluid motors; means for supplying fluid under pressure to said cylinders to impart movement to said pistons; control valves between said fluid supply means and said fluid motors, each valve having a pair of relatively movable elements; motion transmitting means between said continuously rotating shaft and a movable element of each valve and between the other movable elements of said valves and the pistons of said fluid motors; and lock means for retaining certain movable elements of said valves in position to interrupt the operation of said motors at predetermined stages of operation upon the occurrence of a selected condition.

5. In a dinnerware making machine of the type having loading, clay feeding, pressing, jiggering and unloading stations; a support disposed for movement to transfer bat-receiving molds from station to station; driving means having a continuously rotating shaft and intermittent gear means to intermittently move said support to successively register molds thereon with said stations; hydraulic apparatus for moving the molds at the pressing and jiggering stations comprising piston and cylinder type fluid motors; means for supplying fluid under pressure to said cylinders to impart movement to said pistons; control valves between said fluid supply means and said fluid motors, each valve having a pair of relatively movable elements; motion transmitting means between said continuously rotating shaft and a movable element of each valve and between the other movable elements of said valves and the pistons of said fluid motors; lock means for retaining certain movable elements of said valves in position to interrupt the operation of said motors at predetermined stages of operation; and electro-responsive means for rendering said lock means ineffective.

References Cited in the file of this patent

UNITED STATES PATENTS

| Number | Name | Date |
|---|---|---|
| 591,768 | Kaselowsky | Oct. 12, 1897 |
| 1,965,867 | Vickers | July 10, 1934 |
| 2,038,272 | Ernst | Apr. 21, 1936 |
| 2,297,213 | Gosslau | Sept. 29, 1942 |
| 2,321,471 | Emerson | June 8, 1943 |
| 2,407,321 | Miller | Sept. 10, 1946 |
| 2,408,803 | Miller | Oct. 8, 1946 |
| 2,447,090 | Pollock | Aug. 17, 1948 |